United States Patent
Tokuda

(10) Patent No.: US 9,196,903 B2
(45) Date of Patent: Nov. 24, 2015

(54) NONAQUEOUS-ELECTROLYTE BATTERIES AND NONAQUEOUS ELECTROLYTIC SOLUTIONS

(71) Applicant: Hiroyuki Tokuda, Kanagawa (JP)

(72) Inventor: Hiroyuki Tokuda, Kanagawa (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 179 days.

(21) Appl. No.: 13/676,868

(22) Filed: Nov. 14, 2012

(65) Prior Publication Data

US 2013/0084493 A1 Apr. 4, 2013

Related U.S. Application Data

(60) Division of application No. 13/429,580, filed on Mar. 26, 2012, which is a continuation of application No. PCT/JP2010/066413, filed on Sep. 22, 2010.

(30) Foreign Application Priority Data

Sep. 29, 2009 (JP) ................................. 2009-223809

(51) Int. Cl.

| H01M 4/58 | (2010.01) |
| H01M 4/587 | (2010.01) |
| H01M 10/0567 | (2010.01) |
| H01M 10/0525 | (2010.01) |
| H01M 10/0564 | (2010.01) |
| H01M 10/0569 | (2010.01) |
| H01M 4/02 | (2006.01) |

(52) U.S. Cl.
CPC ............ *H01M 4/5825* (2013.01); *H01M 4/587* (2013.01); *H01M 10/0525* (2013.01); *H01M 10/0564* (2013.01); *H01M 10/0567* (2013.01); *H01M 10/0569* (2013.01); *H01M 2004/027* (2013.01); *H01M 2004/028* (2013.01); *H01M 2300/0037* (2013.01); *Y02E 60/122* (2013.01)

(58) Field of Classification Search
CPC ... H01M 4/64; H01M 4/587; H01M 10/0525; H01M 10/0567; H01M 10/0569; H01M 2004/028; H01M 2004/027; H01M 2300/0037; H01M 4/5825; Y02E 60/122
USPC ........... 429/231.1, 221, 231.8, 233, 330, 333, 429/335, 199, 200; 252/62.2
See application file for complete search history.

(56) References Cited

U.S. PATENT DOCUMENTS

| 2006/0292452 A1 | 12/2006 | Utsugi et al. | |
| 2007/0154815 A1 | 7/2007 | Kawasaki et al. | |
| 2007/0166617 A1 | 7/2007 | Gozdz et al. | |
| 2008/0299463 A1 | 12/2008 | Donoue et al. | |
| 2009/0053594 A1* | 2/2009 | Johnson et al. ................ | 429/163 |
| 2010/0081064 A1* | 4/2010 | Watanabe ...................... | 429/338 |
| 2010/0099031 A1 | 4/2010 | Kato et al. | |
| 2010/0119956 A1 | 5/2010 | Tokuda et al. | |

FOREIGN PATENT DOCUMENTS

| CN | 1757134 A | 4/2006 |
| CN | 101090166 A | 12/2007 |
| JP | 2006-156315 | 6/2006 |
| JP | 2006-236809 | 9/2006 |
| JP | 2007-194090 | 8/2007 |
| JP | 2008-300214 | 12/2008 |
| JP | 2009-004357 | 1/2009 |
| JP | 2009-508302 | 2/2009 |

OTHER PUBLICATIONS

International Search Report issued Nov. 9, 2010 in PCT/JP2010/066413 filed Sep. 22, 2010.
Chinese Office Action issued in corresponding Chinese patent application No. 201080040542.1 dated Feb. 8, 2014.
Chinese Office Action issued Aug. 21, 2014, in China Patent Application No. 201080040542.1 (with English translation).
Office Action issued May 13, 2014 in Japanese Patent Application No. 2010-210895 (with English translation).
Combined Office Action and Search Report issued Feb. 25, 2015 in Chinese Patent Application No. 201080040542.1 (with English language translation).
Office Action issued Jul. 2, 2015 in Japanese Patent Application No. 2014-224248 (with English translation).
Office Action issued Sep. 6, 2015 in Chinese Patent Application No. 201080040542.1 (with English translation).

* cited by examiner

*Primary Examiner* — Laura Weiner
(74) *Attorney, Agent, or Firm* — Oblon, McClelland, Maier & Neustadt, L.L.P.

(57) ABSTRACT

This invention relates to a nonaqueous-electrolyte battery containing a current collector, a positive electrode, a negative electrode, and a nonaqueous electrolytic solution. The positive electrode contains a lithium-containing phosphoric acid compound represented by $Li_xMPO_4$ as a positive-electrode active material, where M is at least one element selected from Group-2 to Group-12 metals of the periodic table, and x satisfies $0 < x \leq 1.2$. The negative electrode contains a negative-electrode active material capable of occluding and releasing lithium ions. The nonaqueous electrolytic solution contains a chain ether and a cyclic carbonate having an unsaturated bond.

14 Claims, No Drawings

NONAQUEOUS-ELECTROLYTE BATTERIES AND NONAQUEOUS ELECTROLYTIC SOLUTIONS

CROSS-REFERENCE TO RELATED APPLICATIONS

This application is a Divisional of Ser. No. 13/429,580 filed Mar. 26, 2012 which is a Continuation of PCT/JP10/066,413 filed Sep. 22, 2010. This application is based upon and claims the benefit of priority from prior Japanese Patent Application 2009-223809 filed on Sep. 29, 2009.

TECHNICAL FIELD

The present invention relates to nonaqueous-electrolyte batteries. More particularly, the invention relates to nonaqueous-electrolyte batteries which employ nonaqueous electrolytic solutions that bring about excellent high-output characteristics and excellent durability when iron lithium phosphate is used as the positive electrode.

BACKGROUND ART

Nonaqueous-electrolyte batteries including lithium secondary batteries are being put to practical use in extensive applications ranging from power sources for appliances for so-called public use, such as portable telephones and notebook type personal computers, to vehicle-mounted power sources for driving motor vehicles or the like. However, nonaqueous-electrolyte batteries are increasingly required to have higher performance in recent years, and are required to attain battery characteristics, such as, for example, high capacity, high output, high-temperature storability, cycle characteristics, and high safety, on a high level.

In nonaqueous-electrolyte batteries, $LiCoO_2$ is generally used in the positive electrodes and a carbon material capable of occluding and releasing lithium is generally used in the negative electrodes. As the nonaqueous electrolytic solutions, use is being made of electrolytic solutions prepared by dissolving an electrolyte salt represented by $LiPF_6$ in a nonaqueous organic solvent such as ethylene carbonate or ethyl methyl carbonate.

Lithium cobalt oxide ($LiCoO_2$), which is used as a positive-electrode active material as shown above, has a drawback that this substance in a charged state has low thermal stability and reduces battery safety. Extensive substances have hence been investigated in search of a positive-electrode active material usable as a substitute for $LiCoO_2$.

As one class of substances among these, lithium-containing metal oxides having an olivine structure have recently received attention. For example, nonaqueous-electrolyte batteries employing $LiFePO_4$ as a positive-electrode active material can be made to have improved cycle characteristics and improved battery safety by taking advantage of the high thermal and chemical stability of $LiFePO_4$. In the case of applications such as, for example, hybrid vehicles, such properties are exceedingly useful from the standpoint of increasing the size of mounted batteries to thereby improve energy density per unit weight or improve output energy density or for attaining life prolongation of batteries.

However, $LiFePO_4$ is known to be lower in the electronic conductivity of inner parts of the positive-electrode active material and in high-rate discharge characteristics as compared with $LiCoO_2$, $LiNiO_2$, $LiMnO_2$, $Li(Ni_{1/3}Mn_{1/3}CO_{1/3})O_2$, and the like.

Furthermore, nonaqueous-electrolyte batteries employing $LiFePO_4$ as a positive-electrode active material have had the following problem. When these batteries are repeatedly charged and discharged in a high-temperature environment of, for example, about 60° C., elements including iron which are contained in the active material partly dissolve away with repetitions of charge/discharge, and the dissolved iron adversely affects the negative-electrode active material constituted of a carbon material, etc. As a result, the negative electrode itself is impaired in charge/discharge reversibility and other properties and is hence reduced in reactivity, and this tends to result in a decrease in the capacity or output of the nonaqueous-electrolyte batteries.

Patent document 1 discloses a nonaqueous-electrolyte battery which includes a positive-electrode mix layer that includes a positive-electrode active material including iron lithium phosphate, a conductive material, and a binder and has a density regulated to 1.7 g/cc and which further includes a nonaqueous electrolytic solution containing a solvent including ethylene carbonate and a chain ether, as a nonaqueous-electrolyte battery which can have an improved discharge capacity even during high-rate discharge in which the battery is discharged at a relatively high current.

Patent document 2 discloses a nonaqueous-electrolyte battery which includes a positive-electrode active material including iron lithium phosphate of an olivine structure as a main component, an electrolyte including $LiPF_6$ as a main component, and a nonaqueous solvent that includes, as a main component, a mixed solvent composed of ethylene carbonate and diethyl carbonate or a mixed solvent composed of ethylene carbonate and ethyl methyl carbonate and that further contains at least vinylene carbonate and/or vinylethylene carbonate, as a nonaqueous-electrolyte battery which has a high capacity and high output and can retain the high capacity equal to the initial value even after repeatedly charged/discharged in a high-temperature environment of, for example, 60° C., and which is prevented from decreasing in ordinary-temperature output and low-temperature output, for example, output at around −30° C., and shows the high output equal to the initial value.

PRIOR-ART DOCUMENTS

Patent Documents

Patent Document 1: JP-A-2006-236809
Patent Document 2: JP-A-2009-4357

SUMMARY OF THE INVENTION

Problems that the Invention is to Solve

According to the techniques disclosed in patent document 1, electronic conductivity within the positive electrode is improved by improving close contact between the positive-electrode active material and the conductive material, between the conductive material and the current collector, and between the positive-electrode active material and the current collector. Furthermore, by using a solvent prepared by adding dimethoxyethane, which has an exceedingly low viscosity, to ethylene carbonate, which has a high permittivity, not only the solvent can be sufficiently infiltrated into the positive-electrode mix layer but also the rate of movement of lithium ions is improved. These techniques are thought to improve discharge capacity during high-rate discharge in which the battery is discharged at a relatively high current.

However, in the case where a carbon material, which is the most general material at present, is used in the negative electrode, the battery according to patent document 1 is still insufficient in durability such as high-temperature storability and cycle characteristics because of the poor stability of the negative-electrode coating film.

According to the techniques disclosed in patent document 2, at least part of the vinylene carbonate and/or vinylethylene carbonate decomposes on the electrodes to form a stable deposit, e.g., a coating film, on the surface of the active material of the positive electrode and/or negative electrode. As a result, iron and other elements are inhibited from dissolving away from the positive-electrode active material and such dissolved elements are inhibited from adversely affecting the negative-electrode active material. It is thought that even when the battery is repeatedly charged/discharged, the insertion and release of lithium ions proceed smoothly and capacity deterioration and an increase in internal resistance can be inhibited to thereby inhibit the output from decreasing.

However, the nonaqueous electrolytic solution has a higher viscosity and lower ionic conductivity as compared with nonaqueous-electrolyte employing a chain ether. Because of this, when compared in initial output with the nonaqueous electrolytic solutions employing a chain ether, this prior-art nonaqueous electrolytic solution is still insufficient in output in a low-temperature region, such as output at room temperature or −30° C.

An object of the invention is to provide a nonaqueous-electrolyte battery which has a high initial output at ordinary temperature and −30° C., attains a high discharge capacity even during high-rate discharge, and has a high capacity retention after a durability test such as a high-temperature storage test or cycle test, and which, even after the durability test, has the excellent initial output performance and high-rate discharge capacity. Another object is to provide a nonaqueous electrolytic solution which renders the nonaqueous-electrolyte battery possible.

Means for Solving the Problems

The present inventors diligently made investigations in order to overcome the problems described above. As a result, the inventors have found that a nonaqueous-electrolyte battery which has a high initial output at ordinary temperature and −30° C., attains a high discharge capacity even during high-rate discharge, and has a high capacity retention after a durability test such as a high-temperature storage test or cycle test, and which, even after the durability test, has the excellent output performance and high-rate discharge capacity equal to the initial values can be rendered possible using a lithium-containing metal oxide having an olivine structure as a positive-electrode active material, by incorporating a chain ether and either a compound having the function of forming a negative-electrode coating film or a compound having the function of protecting the positive electrode, in a specific proportion, into an electrolytic-solution composition. The invention has been thus completed.

Namely, essential points of the invention are as follows.

1. A nonaqueous-electrolyte battery which comprises: a current collector; a positive electrode containing a lithium-containing phosphoric acid compound represented by $Li_xMPO_4$ (wherein M is at least one element selected from the group consisting of Group-2 to Group-12 metals of the periodic table, and x satisfies $0<x\leq1.2$) as a positive-electrode active material; a negative electrode containing a negative-electrode active material capable of occluding and releasing lithium ions; and a nonaqueous electrolytic solution, wherein the nonaqueous electrolytic solution contains (1) a chain ether and
(2) a cyclic carbonate having an unsaturated bond.

2. A nonaqueous-electrolyte battery which comprises: a current collector; a positive electrode containing a lithium-containing phosphoric acid compound represented by $Li_xMPO_4$ (wherein M is at least one element selected from the group consisting of Group-2 to Group-12 metals of the periodic table, and x satisfies $0<x\leq1.2$) as a positive-electrode active material; a negative electrode containing a negative-electrode active material capable of occluding and releasing lithium ions; and a nonaqueous electrolytic solution,
wherein the nonaqueous electrolytic solution contains
(1) a chain ether and
(2) at least one compound selected from lithium fluorophosphates, lithium sulfonates, imide lithium salts, sulfonic acid esters, and sulfurous acid esters.

3. The nonaqueous-electrolyte battery according to 1. or 2. above wherein the lithium-containing phosphoric acid compound is represented by $Li_xMPO_4$ (wherein M is at least one element selected from the group consisting of the Group-4 to Group-11 transition metals in the fourth period of the periodic table, and x satisfies $0<x\leq1.2$).

4. The nonaqueous-electrolyte battery according to 1. above wherein the content of the cyclic carbonate having an unsaturated bond is 0.001-5% by mass based on the whole electrolytic solution.

5. The nonaqueous-electrolyte battery according to 1. or 2. above wherein the nonaqueous electrolytic solution contains ethylene carbonate in an amount of 10% by volume or more.

6. The nonaqueous-electrolyte battery according to 1. or 2. above wherein the chain ether is represented by $R^1OR^2$ (wherein $R^1$ and $R^2$ each represent a monovalent organic group which has 1-8 carbon atoms and may have a fluorine atom, and $R^1$ and $R^2$ may be the same or different).

7. The nonaqueous-electrolyte battery according to 1. or 2. above wherein the negative-electrode active material is a carbonaceous material.

8. The nonaqueous-electrolyte battery according to 1. or 2. above wherein the current collector has an electroconductive layer on the surface thereof, the electroconductive layer being different from the current collector in compound composition.

9. A nonaqueous electrolytic solution for use in the nonaqueous-electrolyte battery according to any one of 1. to 8. above.

Effects of the Invention

According to the nonaqueous-electrolyte batteries of the invention, an improvement in high-rate discharge capacity and an increase in output are attained in the case where a lithium-containing metal oxide having an olivine structure is used as a positive-electrode active material, by incorporating a chain ether into a nonaqueous electrolytic solution and thereby lowering the viscosity of the nonaqueous electrolytic solution and improving the ionic conductivity thereof. Furthermore, by incorporating, in a specific proportion, a compound having the function of forming a negative-electrode coating film, the resistance of the coating film on the surface of the negative electrode is prevented from increasing excessively, while maintaining thermal and chemical durability. As a result, not only high high-temperature storability and cycle characteristics can be imparted, but also an improvement in high-rate characteristics and an increase in output can be attained in the battery which has undergone a durability test.

Moreover, by incorporating, in a specific proportion, a compound having the function of protecting the positive electrode, metal dissolution from the positive-electrode active material is inhibited and the resistance of the coating film on the surface of the positive electrode is prevented from increasing excessively, while maintaining thermal and chemical durability. As a result, not only high high-temperature storability and cycle characteristics can be imparted, but also an improvement in high-rate characteristics and an increase in output can be attained in the battery which has undergone a durability test.

MODES FOR CARRYING OUT THE INVENTION

Embodiments of the invention will be explained below. However, the invention should not be construed as being limited to the following embodiments, and can be modified at will.

[Nonaqueous Electrolytic Solutions]

The nonaqueous electrolytic solution for use in the first aspect of the invention contains
(1) a chain ether and
(2) a cyclic carbonate having an unsaturated bond.

The nonaqueous electrolytic solution for use in the second aspect of the invention contains
(1) a chain ether and
(2) at least one compound selected from lithium fluorophosphates, lithium sulfonates, imide lithium salts, sulfonic acid esters, and sulfurous acid esters.

<Chain Ether>

The chain ether preferably is a compound represented by the general formula $R^1OR^2$. In the formula, $R^1$ and $R^2$ each represent a monovalent organic group which has 1-8 carbon atoms and may have a fluorine atom, and $R^1$ and $R^2$ may be the same or different.

More preferred are chain ethers having 3-10 carbon atoms.

Examples of the chain ethers having 3-10 carbon atoms include diethyl ether, di(2-fluoroethyl)ether, di(2,2-difluoroethyl)ether, di(2,2,2-trifluoroethyl)ether, ethyl 2-fluoroethyl ether, ethyl 2,2,2-trifluoroethyl ether, ethyl 1,1,2,2-tetrafluoroethyl ether, 2-fluoroethyl 2,2,2-trifluoroethyl ether, 2-fluoroethyl 1,1,2,2-tetrafluoroethyl ether, 2,2,2-trifluoroethyl 1,1,2,2-tetrafluoroethyl ether, ethyl n-propyl ether, ethyl 3-fluoro-n-propyl ether, ethyl 3,3,3-trifluoro-n-propyl ether, ethyl 2,2,3,3-tetrafluoro-n-propyl ether, ethyl 2,2,3,3,3-pentafluoro-n-propyl ether, 2-fluoroethyl n-propyl ether, 2-floroethyl 3-fluoro-n-propyl ether, 2-fluoroethyl 3,3,3-trifluoro-n-propyl ether, 2-fluoroethyl 2,2,3,3-tetrafluoro-n-propyl ether, 2-fluoroethyl 2,2,3,3,3-pentafluoro-n-propyl ether, 2,2,2-trifluoroethyl n-propyl ether, 2,2,2-trifluoroethyl 3-fluoro-n-propyl ether, 2,2,2-trifluoroethyl 3,3,3-trifluoro-n-propyl ether, 2,2,2-trifluoroethyl 2,2,3,3-tetrafluoro-n-propyl ether, 2,2,2-trifluoroethyl 2,2,3,3,3-pentafluoro-n-propyl ether, 1,1,2,2-tetrafluoroethyl n-propyl ether, 1,1,2,2-tetrafluoroethyl 3-fluoro-n-propyl ether, 1,1,2,2-tetrafluoroethyl 3,3,3-trifluoro-n-propyl ether, 1,1,2,2-tetrafluoroethyl 2,2,3,3-tetrafluoro-n-propyl ether, 1,1,2,2-tetrafluoroethyl 2,2,3,3,3-pentafluoro-n-propyl ether, di-n-propyl ether, n-propyl 3-fluoro-n-propyl ether, n-propyl 3,3,3-trifluoro-n-propyl ether, n-propyl 2,2,3,3-tetrafluoro-n-propyl ether, n-propyl 2,2,3,3,3-pentafluoro-n-propyl ether, di(3-fluoro-n-propyl) ether, 3-fluoro-n-propyl 3,3,3-trifluoro-n-propyl ether, 3-fluoro-n-propyl 2,2,3,3-tetrafluoro-n-propyl ether, 3-fluoro-n-propyl 2,2,3,3,3-pentafluoro-n-propyl ether, di(3,3,3-trifluoro-n-propyl)ether, 3,3,3-trifluoro-n-propyl 2,2,3,3-tetrafluoro-n-propyl ether, 3,3,3-trifluoro-n-propyl 2,2,3,3,3-pentafluoro-n-propyl ether, di(2,2,3,3-tetrafluoro-n-propyl) ether, 2,2,3,3-tetrafluoro-n-propyl 2,2,3,3,3-pentafluoro-n-propyl ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, 2-fluoroethoxy(2,2,2-trifloroethoxy)methane, 2-fluoroethoxy(1,1,2,2-tetrafluoroethoxy)methane, di(2,2,2-trifluoroethoxy)methane, 2,2,2-trifluoroethoxy(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, 2-fluoroethoxy(2,2,2-trifloroethoxy)ethane, 2-fluoroethoxy(1,1,2,2-tetrafluoroethoxy)ethane, di(2,2,2-trifluoroethoxy)ethane, 2,2,2-trifluoroethoxy(1,1,2,2-tetrafluoroethoxy)ethane, di(1,1,2,2-tetrafluoroethoxy) ethane, ethylene glycol di-n-propyl ether, ethylene glycol di-n-butyl ether, and diethylene glycol dimethyl ether.

Preferred of these are dimethoxymethane, diethoxymethane, ethoxymethoxymethane, ethylene glycol di-n-propyl ether, ethylene glycol di-n-butyl ether, and diethylene glycol dimethyl ether from the standpoints of having the high ability to solvate lithium ions and improving dissolution into ions.

From the standpoints of having high oxidation resistance, bringing about a high capacity retention after a durability test such as a high-temperature storage test or a cycle test, and enabling the battery to have the excellent output performance and high-rate discharge capacity equal to the initial values even after the durability test, the following chain ethers are preferred of those: 2,2,2-trifluoroethyl 2,2,3,3-tetrafluoro-n-propyl ether, 1,1,2,2-tetrafluoroethyl 3,3,3-trifluoro-n-propyl ether, 1,1,2,2-tetrafluoroethyl 2,2,3,3-tetrafluoro-n-propyl ether, 3,3,3-trifluoro-n-propyl 2,2,3,3-tetrafluoro-n-propyl ether, 3,3,3-trifluoro-n-propyl 2,2,3,3,3-pentafluoro-n-propyl ether, and di(2,2,3,3-tetrafluoro-n-propyl)ether.

Especially preferred of those are dimethoxymethane, diethoxymethane, ethoxymethoxymethane, 2,2,2-trifluoroethyl 2,2,3,3-tetrafluoro-n-propyl ether, 1,1,2,2-tetrafluoroethyl 3,3,3-trifluoro-n-propyl ether, and 1,1,2,2-tetrafluoroethyl 2,2,3,3-tetrafluoro-n-propyl ether because these chain ethers have low viscosity, impart high ionic conductivity, and bring about excellent battery durability.

One chain ether may be used alone, or two or more chain ethers may be used in any desired combination and proportion. The amount of the chain ether to be incorporated into each nonaqueous electrolytic solution of the invention is desirably as follows. The concentration of the chain ether in the whole nonaqueous solvent is generally 5% by volume or higher, preferably 8% by volume or higher, more preferably 10% by volume or higher, and is generally 70% by volume or less, preferably 60% by volume or less, more preferably 50% by volume or less. In case where the concentration thereof is too low, there is a tendency that it is difficult to obtain the effect of improving ionic conductivity that is attributable to both the improvement in the degree of dissociation into lithium ions and the decrease in viscosity which are to be brought about by the chain ether. In case where the concentration thereof is too high, there are cases where the chain ether is inserted into the negative carbon electrode together with lithium ions, resulting in a decrease in capacity.

The term "whole nonaqueous solvent" in this description means the whole nonaqueous electrolytic solution excluding the cyclic carbonate having an unsaturated bond, sulfonic acid esters, sulfurous acid esters, lithium fluorophosphates, lithium sulfonates, imide lithium salts, and electrolytes which will be described later.

<Cyclic Carbonate Having Unsaturated Bond>

In the nonaqueous electrolytic solutions of the invention, a cyclic carbonate having an unsaturated bond (hereinafter often abbreviated to "unsaturated cyclic carbonate") can be used in order to form a coating film on the surface of the negative electrode of the nonaqueous-electrolyte battery to attain battery life prolongation.

The unsaturated cyclic carbonate is not particularly limited so long as the cyclic carbonate has a carbon-carbon double bond, and any desired unsaturated carbonate can be used. Cyclic carbonates having an aromatic ring are also included in unsaturated cyclic carbonates.

Examples of the unsaturated cyclic carbonate include vinylene carbonate and derivatives thereof, ethylene carbonates substituted with one or more aromatic rings or substituents having a carbon-carbon double bond, phenyl carbonates, vinyl carbonates, allyl carbonates, and catechol carbonates.

Examples of the vinylene carbonate and derivatives thereof include vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, and 4,5-diallylvinylene carbonate.

Examples of the ethylene carbonates substituted with one or more aromatic rings or substituents having a carbon-carbon double bond include vinylethylene carbonate, 4,5-divinylethylene carbonate, 4-methyl-5-vinylethylene carbonate, 4-allyl-5-vinylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, and 4-methyl-5-allylethylene carbonate.

Especially preferred unsaturated cyclic carbonates among these are vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, and 4-allyl-5-vinylethylene carbonate. These carbonates are more suitable because the carbonates form a stable interface-protective coating film.

The molecular weight of the unsaturated cyclic carbonate is not particularly limited, and the carbonate may have any desired molecular weight unless the effects of the invention are considerably lessened thereby. The molecular weight thereof is preferably 50-250. So long as the unsaturated cyclic carbonate has a molecular weight within that range, it is easy to ensure the solubility of the unsaturated cyclic carbonate in the nonaqueous electrolytic solution and the effects of the invention are apt to be sufficiently produced. The molecular weight of the unsaturated cyclic carbonate is more preferably 80 or higher, and is more preferably 150 or lower. Methods for producing the unsaturated cyclic carbonate are not particularly limited, and the carbonate can be produced by a known method selected at will.

One unsaturated cyclic carbonate may be used alone, or two or more unsaturated cyclic carbonates may be used in any desired combination and proportion. The amount of the unsaturated cyclic carbonate to be incorporated is not particularly limited, and the carbonate may be incorporated in any desired amount unless the effects of the invention are considerably lessened thereby. The amount of the unsaturated cyclic carbonate to be incorporated per 100% by mass the nonaqueous solvent, i.e., the amount thereof based on the whole nonaqueous electrolytic solution, is preferably 0.001% by mass or more, more preferably 0.01% by mass or more, even more preferably 0.1% by mass or more, and is preferably 5% by mass or less, more preferably 4% by mass or less, even more preferably 3% by mass or less. So long as the amount of the unsaturated cyclic carbonate is within that range, it is easy to produce the effect of sufficiently improving the cycle characteristics of the nonaqueous-electrolyte battery. In addition, it is easy to avoid the trouble that the battery has reduced high-temperature storability and evolves a gas in an increased amount, resulting in a decrease in discharge capacity retention.

The cyclic carbonate having an unsaturated bond may have a fluorine atom. The number of fluorine atoms possessed by the unsaturated cyclic carbonate having a fluorine atom (hereinafter often abbreviated to "fluorinated unsaturated cyclic carbonate") is not particularly limited so long as the number thereof is 1 or more. In particular, the number of the fluorine atoms is generally 6 or less, preferably 4 or less. Most preferred are fluorinated unsaturated cyclic carbonates having one or two fluorine atoms.

Examples of the fluorinated unsaturated cyclic carbonate include fluorinated vinylene carbonate derivatives and fluorinated ethylene carbonate derivatives substituted with one or more aromatic rings or substituents having a carbon-carbon double bond.

Examples of the fluorinated vinylene carbonate derivatives include 4-fluorovinylene carbonate, 4-fluoro-5-methylvinylene carbonate, 4-fluoro-5-phenylvinylene carbonate, 4-allyl-5-fluorovinylene carbonate, and 4-fluoro-5-vinylvinylene carbonate.

Examples of the fluorinated ethylene carbonate derivatives substituted with one or more aromatic rings or substituents having a carbon-carbon double bond include 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

Especially preferred fluorinated unsaturated cyclic carbonates among these are 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, and 4,5-difluoro-4,5-diallylethylene carbonate. These carbonates are more suitable because the carbonates form a stable interface-protective coating film.

The molecular weight of the fluorinated unsaturated cyclic carbonate is not particularly limited, and the carbonate may have any desired molecular weight unless the effects of the invention are considerably lessened thereby. The molecular weight thereof is preferably 50-250. So long as the fluorinated unsaturated cyclic carbonate has a molecular weight within that range, it is easy to ensure the solubility of the fluorinated cyclic carbonate in the nonaqueous electrolytic solution and the effects of the invention are apt to be produced. Methods for producing the fluorinated unsaturated cyclic carbonate are not particularly limited, and the carbonate can be produced by a known method selected at will. The molecular weight of the fluorinated unsaturated cyclic carbonate is more preferably 100 or higher, and is more preferably 200 or lower.

One fluorinated unsaturated cyclic carbonate may be used alone, or two or more fluorinated unsaturated cyclic carbonates may be used in any desired combination and proportion. The amount of the fluorinated unsaturated cyclic carbonate to be incorporated is not particularly limited, and the carbonate may be incorporated in any desired amount unless the effects of the invention are considerably lessened thereby. The amount of the fluorinated unsaturated cyclic carbonate to be incorporated per 100% by mass the nonaqueous electrolytic solution is usually preferably 0.01% by mass or more, more preferably 0.1% by mass or more, even more preferably 0.2% by mass or more, and is preferably 5% by mass or less, more preferably 4% by mass or less, even more preferably 3% by mass or less. So long as the amount of the fluorinated unsaturated cyclic carbonate is within that range, it is easy to produce the effect of sufficiently improving the cycle characteristics of the nonaqueous-electrolyte battery. In addition, it is easy to avoid the trouble that the battery has reduced high-temperature storability and evolves a gas in an increased amount, resulting in a decrease in discharge capacity retention.

<Sulfonic Acid Esters>

Sulfonic acid esters can be used in the nonaqueous electrolytic solutions to be used in the invention, in order to attain battery life prolongation. Examples of the sulfonic acid esters include cyclic sulfonic acid esters having 3-6 carbon atoms and chain sulfonic acid esters having 1-4 carbon atoms.

Examples of the cyclic sulfonic acid esters having 3-6 carbon atoms include 1,3-propanesultone, 1-methyl-1,3-propanesultone, 2-methyl-1,3-propanesultone, 3-methyl-1,3-propanesultone, 1-ethyl-1,3-propanesultone, 2-ethyl-1,3-propanesultone, 3-ethyl-1,3-propanesultone, 1-fluoro-1,3-propanesultone, 2-fluoro-1,3-propanesultone, 3-fluoro-1,3-propanesultone, 1,4-butanesultone, 1-methyl-1,4-butanesultone, 2-methyl-1,4-butanesultone, 3-methyl-1,4-butanesultone, 4-methyl-1,4-butanesultone, 1-ethyl-1,4-butanesultone, 2-ethyl-1,4-butanesultone, 3-ethyl-1,4-butanesultone, 4-ethyl-1,4-butanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, 1-butene-1,4-sultone, and 3-butene-1,4-sultone.

More suitable of these are 1,3-propanesultone, 1-methyl-1,3-propanesultone, 2-methyl-1,3-propanesultone, 3-methyl-1,3-propanesultone, 1-ethyl-1,3-propanesultone, 1,4-butanesultone, 1-methyl-1,4-butanesultone, 2-methyl-1,4-butanesultone, 3-methyl-1,4-butanesultone, 4-methyl-1,4-butanesultone, 1-propene-1,3-sultone, and the like because such cyclic sulfonic acid esters have the high ability to protect the electrode interface based on interaction with the electrode surface and improve storability and cycle durability.

Examples of the chain sulfonic acid esters having 1-4 carbon atoms include methyl fluorosulfonate, ethyl fluorosulfonate, propyl fluorosulfonate, methyl methanesulfonate, ethyl methanesulfonate, propyl methanesulfonate, methyl ethanesulfonate, ethyl ethanesulfonate, methyl vinylsulfonate, and ethyl vinylsulfonate.

More suitable of these are methyl fluorosulfonate, ethyl fluorosulfonate, methyl methanesulfonate, ethyl methanesulfonate, methyl ethanesulfonate, ethyl ethanesulfonate, methyl vinylsulfonate, ethyl vinylsulfonate, and the like because such chain sulfonic acid esters have the high ability to protect the electrode interface based on interaction with the electrode surface and improve storability and cycle durability.

One sulfonic acid ester may be used alone, or two or more sulfonic acid esters may be used in any desired combination and proportion. The amount of the sulfonic acid ester to be incorporated is not particularly limited, and the sulfonic acid ester may be incorporated in any desired amount unless the effects of the invention are considerably lessened thereby. The amount of the sulfonic acid ester to be incorporated per 100% by mass the nonaqueous electrolytic solution usually is preferably 0.01% by mass or more, more preferably 0.1% by mass or more, even more preferably 0.2% by mass or more, and is preferably 5% by mass or less, more preferably 4% by mass or less, even more preferably 3% by mass or less. So long as the amount of the sulfonic acid ester is within that range, it is easy to produce the effect of sufficiently improving the cycle characteristics of the nonaqueous-electrolyte battery. In addition, it is easy to avoid the trouble that the battery has reduced high-temperature storability and evolves a gas in an increased amount, resulting in a decrease in discharge capacity retention.

<Sulfurous Acid Esters>

Cyclic sulfurous acid esters can be used in the nonaqueous electrolytic solutions to be used in the invention, in order to attain battery life prolongation. Examples of the sulfurous acid esters include cyclic sulfurous acid esters having 3-6 carbon atoms.

Examples of the cyclic sulfurous acid esters having 3-6 carbon atoms include ethylene sulfite, 4-methylethylene sulfite, 4,4-dimethylethylene sulfite, 4,5-dimethylethylene sulfite, 4-ethylethyene sulfite, 4,4-diethylethylene sulfite, and 4,5-diethylethylene sulfite.

More suitable of these are ethylene sulfite and 4-methylethylene sulfite because these cyclic sulfurous acid esters have the high ability to protect the electrode interface based on interaction with the electrode surface and improve storability and cycle durability.

One sulfurous acid ester may be used alone, or two or more sulfurous acid esters may be used in any desired combination and proportion. The amount of the sulfurous acid ester to be incorporated is not particularly limited, and the sulfurous acid ester may be incorporated in any desired amount unless the effects of the invention are considerably lessened thereby. The amount of the cyclic sulfurous acid ester to be incorporated per 100% by mass the nonaqueous electrolytic solution usually is preferably 0.01% by mass or more, more preferably 0.1% by mass or more, even more preferably 0.2% by mass or more, and is preferably 5% by mass or less, more preferably 4% by mass or less, even more preferably 3% by mass or less. So long as the amount of the cyclic sulfurous acid ester is within that range, it is easy to produce the effect of sufficiently improving the cycle characteristics of the nonaqueous-electrolyte battery. In addition, it is easy to avoid the trouble that the battery has reduced high-temperature storability and evolves a gas in an increased amount, resulting in a decrease in discharge capacity retention.

<Other Ingredients>

In the invention, it is possible to use cyclic carbonates including ethylene carbonate, chain carbonates, cyclic and chain esters other than carbonic acid esters, cyclic ethers, sulfone compounds, and the like.

<Cyclic Carbonates>

Ethylene Carbonate

It is preferred that the nonaqueous electrolytic solutions to be used in the invention each should contain ethylene carbonate, and the content thereof based on the whole nonaqueous solvent is as follows. The lower limit thereof is preferably 10% by volume or more, and the upper limit thereof is preferably 70% by volume or less. The lower limit thereof is generally 15% by volume or more, and the upper limit thereof is generally 40% by volume or less.

Cyclic Carbonates Other than Ethylene Carbonate

Examples of the cyclic carbonates other than ethylene carbonate include cyclic carbonates having an alkylene group with 3 or 4 carbon atoms.

Specifically, examples of the cyclic carbonates having an alkylene group with 3 or 4 carbon atoms include propylene carbonate and butylene carbonate. Especially preferred of these is propylene carbonate from the standpoint of improving battery characteristics on the basis of an improvement in the degree of dissociation into lithium ions.

It is desirable in the invention that one or more such cyclic carbonates other than ethylene carbonate should be incorporated in a concentration of generally 5% by volume or higher, preferably 10% by volume or higher, based on the whole nonaqueous solvent in the nonaqueous electrolytic solution. In case where the concentration thereof is less than the lower limit, the incorporation thereof brings about little increase in the electrical conductivity of the nonaqueous electrolytic solution of the invention. In particular, there are cases where the incorporation thereof does not contribute to an improvement in the high-current discharge characteristics of the nonaqueous-electrolyte battery of the invention. It is also desirable that one or more cyclic carbonates other than ethylene carbonate should be incorporated in a concentration of generally 40% by volume or less, preferably 35% by volume or less. In case where the concentration thereof exceeds the range, there is a tendency that the nonaqueous electrolytic solution has an increased viscosity coefficient and this reduces the electrical conductivity thereof. In particular, there are cases where the nonaqueous-electrolyte battery is reduced in high-current discharge characteristics.

With respect to the term "whole nonaqueous solvent" used here also, this term means the whole nonaqueous electrolytic solution excluding the cyclic carbonate having an unsaturated bond, sulfonic acid esters, and sulfurous acid esters which were described above, the lithium fluorophosphates, lithium sulfonates, and imide lithium salts which will be described later, and the electrolytes which will be described later, as in the case of ethylene carbonate.

Saturated Cyclic Carbonates Having Fluorine Atom(s)

Saturated cyclic carbonates having a fluorine atom (hereinafter often abbreviated to "fluorinated saturated cyclic carbonates") are not particularly limited. Examples thereof include derivatives of saturated cyclic carbonates having an alkylene group with 2-6 carbon atoms. Specific examples thereof include ethylene carbonate derivatives. Examples of the ethylene carbonate derivatives include products of fluorination of either ethylene carbonate or ethylene carbonate substituted with one or more alkyl groups (e.g., alkyl groups having 1-4 carbon atoms). Preferred of these are such fluorination products having 1-8 fluorine atoms.

Specific examples thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)ethylene carbonate, 4-(difluoromethyl)ethylene carbonate, 4-(trifluoromethyl)ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

More preferred of these is at least one member selected from the group consisting of monofluoroethylene carbonate, 4,4-difluoroethylene carbonate, 4,5-difluoroethylene carbonate, and 4,5-difluoro-4,5-dimethylethylene carbonate because these carbonates impart high ionic conductivity and satisfactorily form an interface-protective coating film.

One fluorinated saturated cyclic carbonate may be used alone, or two or more fluorinated saturated cyclic carbonates may be used in any desired combination and proportion. The amount of the fluorinated saturated cyclic carbonate to be incorporated is not particularly limited, and the carbonate may be used in any desired amount unless the effects of the invention are considerably lessened thereby. However, the amount thereof per 100% by mass the nonaqueous solvent is preferably 0.01% by mass or more, more preferably 0.1% by mass or more, even more preferably 0.2% by mass or more. With respect to the upper limit thereof, the amount of the carbonate is less than 50% by mass, preferably 45% by mass or less. So long as the amount of the fluorinated saturated cyclic carbonate is within that range, it is easy to produce the effect of sufficiently improving the cycle characteristics of the nonaqueous-electrolyte battery. In addition, it is easy to avoid the trouble that the battery has reduced high-temperature storability and evolves a gas in an increased amount, resulting in a decrease in discharge capacity retention.

<Chain Carbonates>

Chain carbonates having 3-7 carbon atoms are preferred.

Examples of the chain carbonates having 3-7 carbon atoms include dimethyl carbonate, diethyl carbonate, di-n-propyl carbonate, diisopropyl carbonate, n-propyl isopropyl carbonate, ethyl methyl carbonate, methyl n-propyl carbonate, n-butyl methyl carbonate, isobutyl methyl carbonate, t-butyl methyl carbonate, ethyl n-propyl carbonate, n-butyl ethyl carbonate, isobutyl ethyl carbonate, and t-butyl ethyl carbonate.

Preferred of these are dimethyl carbonate, diethyl carbonate, di-n-propyl carbonate, diisopropyl carbonate, n-propyl isopropyl carbonate, ethyl methyl carbonate, and methyl n-propyl carbonate.

Especially preferred of these are dimethyl carbonate, diethyl carbonate, and ethyl methyl carbonate.

Chain carbonates having a fluorine atom (hereinafter, the carbonates are often abbreviated to "fluorinated chain carbonates") also are suitable. The number of fluorine atoms possessed by each fluorinated chain carbonate also is not particularly limited so long as the number thereof is 1 or more. However, the number thereof is generally 6 or less, preferably 4 or less. In the case where a fluorinated chain carbonate has a plurality of fluorine atoms, these fluorine atoms may be the same or different. Examples of the fluorinated chain carbonates include ethylene carbonate derivatives, dimethyl carbonate derivatives, ethyl methyl carbonate derivatives, and diethyl carbonate derivatives.

Examples of the dimethyl carbonate derivatives include fluoromethyl methyl carbonate, difluoromethyl methyl carbonate, trifluoromethyl methyl carbonate, bis(fluoromethyl) carbonate, bis(difluoro)methyl carbonate, and bis(trifluoro) methyl carbonate.

Examples of the ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the diethyl carbonate derivatives include ethyl 2-fluoroethyl carbonate, ethyl 2,2-difluoroethyl carbonate, bis(2-fluoroethyl) carbonate, ethyl 2,2,2-trifluoroethyl carbonate, 2,2-difluoroethyl 2'-fluoroethyl carbonate, bis(2,2-difluoroethyl) carbonate, 2,2,2-trifloroethyl 2'-fluoroethyl carbonate, 2,2,2-trifluoroethyl 2',2'-difluoroethyl carbonate, and bis(2,2,2-trifluoroethyl) carbonate.

With respect to the chain carbonates explained above also, any one of these chain carbonates may be incorporated alone into each nonaqueous electrolytic solution of the invention or two or more thereof may be incorporated in any desired combination and proportion.

In each nonaqueous electrolytic solution to be used in the invention, it is desirable that at least one chain carbonate should be incorporated in a concentration of preferably 15% by volume or higher, more preferably 20% by volume or higher, even more preferably 25% by volume or higher, based on the whole nonaqueous solvent in the nonaqueous electrolytic solution. It is also desirable that the chain carbonate be incorporated in a concentration of 85% by volume or less, more preferably 80% by volume or less, even more preferably 75% by volume or less.

So long as the concentration thereof is within that range, the nonaqueous electrolytic solution suffers neither an increase in viscosity nor a decrease in ionic conductivity and, hence, has satisfactory high-current electrical conduction characteristics.

In each nonaqueous electrolytic solution of the invention, ethylene carbonate and a specific chain carbonate may be incorporated in specific amounts together with a specific chain ether compound. Thus, the performance of the electrolytic solution can be greatly improved.

For example, in the case where dimethoxyethane was selected as the chain ether, it is preferred to select ethyl methyl carbonate as the specific chain carbonate. In this case, it is especially preferred that ethylene carbonate should be incorporated in an amount of 15% by volume to 40% by volume, dimethoxyethane be incorporated in an amount of 10% by volume to 40% by volume, and ethyl methyl carbonate be incorporated in an amount of 30% by volume to 60% by volume. By selecting ethyl methyl carbonate as the chain carbonate and by selecting these incorporation amounts, the compatibility temperature range can be widened and the lower-temperature-side precipitation temperature for lithium salts can be lowered.

In the case where diethoxyethane was selected as the chain ether in another example, it is preferred to select dimethyl carbonate as the specific chain carbonate. In this case, it is especially preferred that ethylene carbonate should be incorporated in an amount of 15% by volume to 40% by volume, diethoxyethane be incorporated in an amount of 20% by volume to 60% by volume, and dimethyl carbonate be incorporated in an amount of 15% by volume to 60% by volume. By selecting dimethyl carbonate as the chain carbonate and by selecting these incorporation amounts, the nonaqueous electrolytic solution can be made to have a reduced viscosity and improved ionic conductivity while lowering the lower-temperature-side precipitation temperature for lithium salts, and high output can be obtained even at low temperatures.

<Cyclic Esters other than Cyclic Carbonic Acid Esters>

Examples of the cyclic esters other than cyclic carbonic acid esters include cyclic esters having 3-12 carbon atoms.

Specific examples thereof include γ-butyrolactone, γ-valerolactone, γ-caprolactone, and ε-caprolactone. Of these, γ-butyrolactone is especially preferred from the standpoint of the improvement in battery characteristics which is attributable to an improvement in the degree of dissociation into lithium ions.

It is desirable in the invention that such a cyclic ester should be incorporated in a concentration of generally 5% by volume or higher, preferably 10% by volume or higher, based on the whole nonaqueous solvent in the nonaqueous electrolytic solution. In case where the concentration thereof is lower than the lower limit, the effect of increasing the electrical conductivity of the nonaqueous electrolytic solution of the invention is low and, in particular, there are cases where the incorporation of the cyclic ester does not contribute to an improvement in the high-current discharge characteristics of the nonaqueous-electrolyte battery. It is also desirable that the cyclic ester should be incorporated in a concentration of generally 40% by volume or less, preferably 35% by volume or less. In case where the concentration thereof exceeds the range, there is a tendency that the nonaqueous electrolytic solution has an increased viscosity coefficient and this reduces the electrical conductivity thereof or increases the resistance of the negative electrode. In particular, there are cases where the nonaqueous-electrolyte battery has reduced high-current discharge characteristics.

<Chain Esters Other than Chain Carbonic Acid Esters>

Examples of the chain esters other than chain carbonic acid esters include chain esters having an alkylene group with 3-7 carbon atoms.

Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Especially preferred of these are methyl acetate, ethyl acetate, n-propyl acetate, n-butyl acetate, methyl propionate, ethyl propionate, n-propyl propionate, isopropyl propionate, methyl butyrate, ethyl butyrate, and the like from the standpoint of improving ionic conductivity on the basis of a decrease in viscosity.

It is desirable in the invention that such a chain ester should be incorporated in a concentration of generally 10% by volume or higher, preferably 15% by volume or higher, based on the whole nonaqueous solvent in the nonaqueous electrolytic solution. In case where the concentration thereof is lower than the lower limit, the effect of increasing the electrical conductivity of the nonaqueous electrolytic solution of the invention is low and, in particular, there are cases where the incorporation of the chain ester does not contribute to an improvement in the high-current discharge characteristics of the nonaqueous-electrolyte battery. It is also desirable that the chain ester should be incorporated in a concentration of generally 60% by volume or less, preferably 50% by volume or less. In case where the concentration thereof exceeds the range, there is a tendency that the negative electrode has increased resistance and the nonaqueous-electrolyte battery suffers a decrease in high-current discharge characteristics and a decrease in cycle characteristics.

<Cyclic Ethers>

Examples of the cyclic ethers include cyclic ethers having an alkylene group with 3-6 carbon atoms.

Specific examples thereof include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane, and compounds formed by fluorinating these.

Especially preferred of these are 2-methyltetrahydrofuran and 2-methyl-1,3-dioxane. This is because these cyclic ethers have low viscosity and the high ability to solvate lithium ions and, hence, improve dissociation into ions, thereby imparting high ionic conductivity.

The amount of the cyclic ether to be incorporated, per 100% by volume the nonaqueous solvent, usually is preferably 5% by volume or more, more preferably 10% by volume or more, even more preferably 15% by volume or more, and is preferably 40% by volume or less, more preferably 35% by volume or less, even more preferably 30% by volume or less. So long as the amount thereof is within that range, it is easy to ensure the effect of improving ionic conductivity which is attributable to the improvement in the degree of dissociation into lithium ions and the decrease in viscosity which are brought about by the cyclic ether. In addition, in the case where the negative-electrode active material is a carbonaceous material, it is easy to avoid the trouble that the cyclic ether is inserted into the active material together with lithium ions, resulting in a decrease in capacity.

<Sulfone Compounds>

Preferred sulfone compounds are cyclic sulfones having 3-6 carbon atoms and chain sulfones having 2-6 carbon atoms. It is preferred that the number of sulfonyl groups per molecule should be 1 or 2.

Examples of the cyclic sulfones include monosulfone compounds such as trimethylene sulfone compounds, tetramethylene sulfone compounds, and hexamethylene sulfone compounds and disulfone compounds such as trimethylene disulfone compounds, tetramethylene disulfone compounds, and hexamethylene disulfone compounds. From the standpoints of permittivity and viscosity, tetramethylene sulfone compounds, tetramethylene disulfone compounds, hexamethylene sulfone compounds, and hexamethylene disulfone compounds are more preferred of those, and tetramethylene sulfone compounds (sulfolane compounds) are especially preferred.

The sulfolane compounds preferably are sulfolane and/or sulfolane derivatives (hereinafter, these compounds including sulfolane are often referred to simply as "sulfolane compounds"). The sulfolane derivatives preferably are sulfolane compounds in which one or more of the hydrogen atoms bonded to the carbon atoms constituting the sulfolane ring each have been replaced with a fluorine atom or an alkyl group.

Preferred of these are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, and 5-fluoro-3-(trifluoromethyl)sulfolane, from the standpoint that these sulfolane compounds have high ionic conductivity and bring about high input/output characteristics.

Examples of the chain sulfones include dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, t-butyl methyl sulfone, t-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl) sulfone, perfluorodiethyl sulfone, fluoromethyl n-propyl sulfone, difluoromethyl n-propyl sulfone, trifluoromethyl n-propyl sulfone, fluoromethyl isopropyl sulfone, difluoromethyl isopropyl sulfone, trifluoromethyl isopropyl sulfone, trifluoroethyl n-propyl sulfone, trifluoroethyl isopropyl sulfone, pentafluoroethyl n-propyl sulfone, pentafluoroethyl isopropyl sulfone, trifluoroethyl n-butyl sulfone, trifluoroethyl t-butyl sulfone, pentafluoroethyl n-butyl sulfone, and pentafluoroethyl t-butyl sulfone.

Preferred of these are dimethyl sulfone, ethyl methyl sulfone, diethyl sulfone, n-propyl methyl sulfone, isopropyl methyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl n-propyl sulfone, trifluoromethyl isopropyl sulfone, trifluoroethyl n-butyl sulfone, trifluoroethyl t-butyl sulfone, trifluoromethyl n-butyl sulfone, trifluoromethyl t-butyl sulfone, and the like, from the standpoint that these sulfone compounds have high ionic conductivity and bring about high input/output characteristics.

The amount of the sulfone compound to be incorporated, per 100% by mass the nonaqueous solvent, usually is preferably 0.3% by mass or more, more preferably 0.5% by mass or more, even more preferably 1% by mass or more, and is preferably 40% by mass or less, more preferably 35% by mass or less, even more preferably 30% by mass or less. So long as the amount thereof is within that range, it is easy to obtain the effect of improving durability such as cycle characteristics and storability. In addition, the viscosity of the nonaqueous electrolytic solution can be regulated so as to be within a proper range, and a decrease in electrical conductivity can be avoided. Furthermore, it is easy to avoid the trouble that the nonaqueous-electrolyte battery decreases in charge/discharge capacity retention when charged and discharged at a high current density.

<Electrolytes>

Examples of electrolytes which can be contained in the nonaqueous electrolytic solutions to be used in the invention include lithium fluorophosphates, lithium sulfonates, and imide lithium salts. Preferred of these lithium salts are compounds having the high ability to be adsorbed onto or interact with the surface of the positive-electrode active material. In the case where a compound having the high ability to be adsorbed onto or interact with the electrode surface is used, the resistance of the coating film on the electrode surface can be prevented from increasing excessively, while maintaining thermal and chemical durability. As a result, not only high high-temperature storability and cycle characteristics can be imparted, but also an improvement in high-rate characteristics and an increase in output can be attained in the battery which has undergone a durability test. Besides those lithium salts, any desired lithium salts can be used.

<Lithium Fluorophosphates>

Examples of the lithium fluorophosphates include lithium fluorophosphate and lithium difluorophosphate. Such lithium salts may be used in combination. In particular, lithium difluorophosphate is preferred because this lithium salt has the high ability to be adsorbed onto or interact with the surface of the electrode active material.

<Lithium Sulfonates>

Examples of the lithium sulfonates include lithium methanesulfonate, lithium monofluoromethanesulfonate, lithium difluoromethanesulfonate, and lithium trifluoromethanesulfonate. Such lithium salts may be used in combination. In particular, lithium trifluoromethanesulfonate is preferred because this lithium salt has the high ability to be adsorbed onto or interact with the surface of the electrode active material.

<Imide Lithium Salts>

Examples of the imide lithium salts include $LiN(FCO_2)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, and $LiN(CF_3SO_2)(C_4F_9SO_2)$. Such salts may be used in combination. In particular, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, and the lithium salt of cyclic 1,2-perfluoroethanedisulfonylimide are preferred because these lithium salts have the high ability to be adsorbed onto or interact with the surface of the electrode active material.

<Other Lithium Salts>

Examples of lithium salts other than the lithium fluorophosphates, lithium sulfonates, and imide lithium salts include:

carboxylic acid lithium salts such as lithium formate, lithium acetate, lithium monofluoroacetate, lithium difluoroacetate, and lithium trifluoroacetate;

lithium methide compounds such as $LiC(FSO_2)_3$, $LiC(CF_3SO_2)_3$, and $LiC(C_2F_5SO_2)_3$;

lithium oxalatoborate salts such as lithium difluorooxalatoborate and lithium bis(oxalato)borate;

lithium oxalatophosphate salts such as lithium tetrafluorooxalatophosphate, lithium difluorooxalatophosphate, and lithium tris(oxalato)phosphate; and other fluorine-containing organolithium salts such as $LiBF_4$, $LiPF_4(CF_3)_2$, $LiPF_4(C_2F_5)_2$, $LiPF_4(CF_3SO_2)_2$, $LiBF_4(C_2F_5SO_2)_2$, $LiBF_2(CF_3)^2$, $LiBF_2(C_2F_5)_2$, $LiBF_2(CF_3SO_2)_2$, and $LiBF_2(C_2F_5SO_2)_2$.

Preferred of these, for use as main electrolytes for the nonaqueous electrolytic solutions, are $LiPF_6$, $LiBF_4$, lithium trifluoromethanesulfonate, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, and the lithium salt of cyclic 1,3-perfluoropropanedisulfonylimide from the standpoint of improving battery performance.

The concentration of each of these main electrolytes in the nonaqueous electrolytic solutions is not particularly limited. However, the concentration thereof is generally 0.5 mol/L or higher, preferably 0.6 mol/L or higher, more preferably 0.7 mol/L or higher, and is generally 3 mol/L or less, preferably 2 mol/L or less, more preferably 1.8 mol/L or less, especially preferably 1.5 mol/L or less. In the case where the concentration of the electrolyte added is within that range, the effect of improving battery characteristics is sufficiently produced and it is easy to avoid the trouble that the resistance of charge movement increases to reduce charge/discharge performance.

One of those main electrolytes for the nonaqueous electrolytic solutions may be used alone, or two or more thereof may be used in combination. In the case where two or more main electrolytes are used in combination, a preferred example is a combination of $LiPF_6$ with $LiBF_4$, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, or the like. This combination has the effect of improving output characteristics, high-rate charge/discharge characteristics, high-temperature storability, cycle characteristics, etc.

Also in the case where two or more main electrolytes are contained in a nonaqueous electrolytic solution, the concentration of the electrolytes is not particularly limited. However, the total concentration of the main electrolytes is generally 0.5 mol/L or higher, preferably 0.6 mol/L or higher, more preferably 0.7 mol/L or higher, and is generally 3 mol/L or less, preferably 2 mol/L or less, more preferably 1.8 mol/L or less, especially preferably 1.5 mol/L or less. In the case where the concentration of the electrolytes added is within that range, the effect of improving battery characteristics is sufficiently produced and it is easy to avoid the trouble that the resistance of charge amount increases to reduce charge/discharge performance.

It is also preferred that an electrolyte other than the main electrolytes for the nonaqueous electrolytic solutions should be added besides one or more of the main electrolytes. Preferred examples of electrolytes to be added when $LiPF_6$ is used as a main electrolyte include $LiBF_4$, lithium monofluorophosphate, lithium difluorophosphate, lithium formate, lithium acetate, lithium monofluoroacetate, lithium difluoroacetate, lithium trifluoroacetate, lithium methanesulfonate, lithium monofluoromethanesulfonate, lithium difluoromethanesulfonate, lithium trifluoromethanesulfonate, $LiN(FSO_2)_2$, $LiN(FSO_2)(CF_3SO_2)$, lithium difluorooxalatoborate, lithium tetrafluorooxalatophosphate, and lithium difluorooxalatophosphate. Addition of these electrolytes has the effect of improving output characteristics and high-rate characteristics.

Furthermore, it is preferred to add lithium fluorophosphate, lithium difluorophosphate, lithium trifluoromethanesulfonate, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, lithium difluorooxalatoborate, lithium tetrafluorooxalatophosphate, lithium difluorooxalatophosphate, or the like besides the main electrolyte, because the addition thereof has the effect of improving high-temperature storability and cycle characteristics.

The concentration of the electrolyte added to a nonaqueous electrolytic solution besides the main electrolyte is also not particularly limited. However, the concentration thereof is preferably 0.01% by mass or higher, more preferably 0.03% by mass or higher, even more preferably 0.05% by mass or higher, and is preferably 8% by mass or less, more preferably 6% by mass or less, even more preferably 5% by mass or less. When the concentration of the electrolyte added is within that range, the effect of improving battery characteristics is sufficiently produced and it is easy to avoid the trouble that the resistance of charge movement increases to reduce charge/discharge performance.

Incidentally, $LiBF_4$, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, and the like have the effect of improving the performance of the battery regardless of whether these salts are added as main electrolytes or added as electrolytes besides a main electrolyte.

<Overcharge Inhibitor>

An overcharge inhibitor can be used in the nonaqueous electrolytic solutions of the invention in order to effectively inhibit the nonaqueous-electrolyte batteries from bursting or firing when brought into an overcharged state or the like.

Examples of the overcharge inhibitor include: aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran; products of partial fluorination of these aromatic compounds, such as 2-fluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole. Preferred of these are aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran. One of these may be used alone, or two or more thereof may be used in combination. In the case where two or more compounds are used in combination, the following combinations are especially preferred from the standpoint of a balance between overcharge-preventive properties and high-temperature storability: a combination of cyclohexylbenzene with t-butylbenzene or t-amylbenzene; and a combination of at least one member selected from aromatic compounds containing no oxygen, such as biphenyl, alkylbiphenyls, terphenyl, partly hydrogenated terphenyls, cyclohexylbenzene, t-butylbenzene, and t-amylbenzene, with at least one member selected from oxygen-containing aromatic compounds such as diphenyl ether and dibenzofuran.

The amount of the overcharge inhibitor to be incorporated is not particularly limited, and the overcharge inhibitor may be incorporated in any desired amount unless the effects of the invention are considerably lessened thereby. The amount of the overcharge inhibitor is preferably 0.01-5% by mass per 100% by mass the nonaqueous solvent. So long as the amount thereof is within that range, it is easy to sufficiently produce the effect of the overcharge inhibitor and it is easy to avoid the trouble that battery characteristics including high-temperature storability decrease. The amount of the overcharge inhibitor is more preferably 0.01% by mass or more, even more preferably 0.1% by mass or more, especially preferably 0.2% by mass or more, and is more preferably 3% by mass or less, even more preferably 2% by mass or less.

<Other Aids>

Other known aids can be used in the nonaqueous electrolytic solutions of the invention. Examples of the other aids include: carbonate compounds such as erythritane carbonate, spiro-bis-dimethylene carbonate, and methoxyethyl methyl carbonate; carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; Spiro compounds such as 2,4,8,10-tetraoxaspiro[5.5]undecane and 3,9-divinyl-2,4,8,10-tetraoxaspiro[5.5]undecane; sulfur-containing compounds such as busulfan, sulfolene, diphenyl sulfone, N,N-dimethylmethanesulfonamide, and N,N-diethylmethanesulfonamide; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, nonane, decane, and cycloheptane; and fluorine-containing aromatic compounds such as fluorobenzene, difluorobenzene, hexafluorobenzene, and benzotrifluoride. One of these aids may be used alone, or two or more thereof may be used in combination. By adding these aids, capacity retentivity after high-temperature storage and cycle characteristics can be improved.

The amount of the other aids to be incorporated is not particularly limited, and the other aids may be incorporated in any desired amount unless the effects of the invention are considerably lessened thereby. The amount of the other aids is preferably 0.01-5% by mass per 100% by mass the nonaqueous solvent. So long as the amount thereof is within that range, it is easy to sufficiently produce the effects of the other aids and it is easy to avoid the trouble that battery characteristics including high-load discharge characteristics decrease. The amount of the other aids to be incorporated is more preferably 0.1% by mass or more, even more preferably 0.2% by mass or more, and is more preferably 3% by mass or less, even more preferably 1% by mass or less.

The nonaqueous electrolytic solutions described above include the nonaqueous electrolytic solutions present in inner parts of the nonaqueous-electrolyte batteries according to the invention. Specifically, the invention includes: the nonaqueous electrolytic solution present in a nonaqueous-electrolyte battery obtained by separately synthesizing constituent elements for a nonaqueous electrolytic solution, such as a lithium salt, a solvent, and aids, preparing the nonaqueous electrolytic solution from the substantially separate constituent elements, and introducing the nonaqueous electrolytic solution into a battery separately assembled by the method which will be described later. The invention further includes: the case in which constituent elements for a nonaqueous electrolytic solution of the invention are separately introduced into a battery and mixed together within the battery to thereby obtain the same composition as the nonaqueous electrolytic solution of the invention; and the case in which a compound serving as a component of a nonaqueous electrolytic solution of the invention is generated within the nonaqueous-electrolyte battery to obtain the same composition as the nonaqueous electrolytic solution of the invention.

[Battery Configuration]

The nonaqueous-electrolyte batteries of the invention may have the same battery configuration as conventionally known nonaqueous-electrolyte batteries. Usually, the batteries of the invention have a configuration obtained by superposing a positive electrode and a negative electrode through a porous film (separator) impregnated with a nonaqueous electrolytic solution of the invention and disposing the stack in a case (outer case). Consequently, the shapes of the nonaqueous-electrolyte batteries of the invention are not particularly limited, and may be any of cylindrical, prismatic, laminate type, coin type, large-size, and other shapes.

[Negative Electrode]

The negative-electrode active material to be used in the negative electrode is described below. The negative-electrode active material is not particularly limited so long as the active material is capable of electrochemically occluding and releasing lithium ions. Examples thereof include a carbonaceous material, an alloy material, and a lithium-containing composite metal oxide material.

[Negative-Electrode Active Material]

Examples of the negative-electrode active material include a carbonaceous material, an alloy material, and a lithium-containing composite metal oxide material.

The carbonaceous material to be used as a negative-electrode active material preferably is a material selected from:
(1) natural graphites;
(2) carbonaceous materials obtained by subjecting artificial carbonaceous substances and artificial graphitic substances to a heat treatment at a temperature in the range of 400-3,200° C. one or more times;
(3) carbonaceous materials giving a negative-electrode active-material layer which is composed of at least two carbonaceous substances differing in crystallinity and/or has an interface where at least two carbonaceous substances differing in crystallinity are in contact with each other; and
(4) carbonaceous materials giving a negative-electrode active-material layer which is composed of at least two carbonaceous substances differing in orientation and/or has an interface where at least two carbonaceous substances differing in orientation are in contact with each other.

This is because this carbonaceous material brings about a satisfactory balance between initial irreversible capacity and high-current-density charge/discharge characteristics. One of the carbonaceous materials (1) to (4) may be used alone, or two or more thereof may be used in any desired combination and proportion.

Examples of the artificial carbonaceous substances and artificial graphitic substances in (2) above include natural graphites, coal coke, petroleum coke, coal pitch, petroleum pitch, carbonaceous substances obtained by oxidizing these pitches, needle coke, pitch coke, carbon materials obtained by partly graphitizing these cokes, products of the pyrolysis of organic substances, such as furnace black, acetylene black, and pitch-derived carbon fibers, organic substances capable of carbonization and products of the carbonization thereof, or solutions obtained by dissolving any of such organic substances capable of carbonization in a low-molecular organic solvent, e.g., benzene, toluene, xylene, quinoline, or n-hexane, and products of the carbonization of these solutions.

The alloy material to be used as a negative-electrode active material is not particularly limited so long as the material is capable of occluding and releasing lithium. Use may be made of elemental lithium, an elemental metal or alloy which forms a lithium alloy, or any of compounds thereof, such as oxides, carbides, nitrides, silicides, sulfides, and phosphides. The elemental metal or alloy which forms a lithium alloy preferably is a material including any of the metals and semimetals in Group 13 and Group 14 (that is, carbon is excluded). More preferred are elemental aluminum, silicon, and tin (hereinafter, these metals are often referred to as "specific metallic elements") and alloys or compounds containing one or more atoms of any of these metals. One of such materials may be used alone, or two or more thereof may be used in any desired combination and proportion.

Examples of the negative-electrode active material including atoms of at least one member selected from the specific metallic elements include: the elemental metal which is any one of the specific metallic elements; alloys constituted of two or more specific metallic elements; alloys constituted of one or more specific metallic elements and one or more other metallic elements; compounds containing one or more specific metallic elements; and composite compounds, e.g., oxides, carbides, nitrides, silicides, sulfides, or phosphides, of these compounds. By using any of these elemental metals, alloys, and metal compounds as a negative-electrode active material, a battery having a higher capacity can be obtained.

Examples of the negative-electrode active material further include compounds formed by the complicated bonding of any of those composite compounds to one or more elemental metals or alloys or to several elements, e.g., nonmetallic elements. Specifically, in the case of silicon and tin, for example, use can be made of an alloy of those elements with a metal which does not function as a negative electrode. In the case of tin, for example, use may be made of a complicated compound constituted of a combination of five to six elements including tin, a metal which functions as a negative electrode and is not silicon, a metal which does not function as a negative electrode, and a nonmetallic element.

Preferred of those negative-electrode active materials are the elemental metal which is any one of the specific metallic elements, alloys of two or more of the specific metallic elements, and oxides, carbides, nitrides, and other compounds of the specific metallic elements. This is because these negative-electrode active materials give a battery having a high capacity per unit mass. Especially preferred are the elemental metal(s), alloys, oxides, carbides, nitrides, and the like of silicon and/or tin from the standpoints of capacity per unit mass and environmental burden.

The lithium-containing composite metal oxide material to be used as a negative-electrode active material is not particularly limited so long as the material is capable of occluding and releasing lithium. However, from the standpoint of high-current-density charge/discharge characteristics, materials containing both titanium and lithium are preferred, and lithium-containing composite metal oxide materials containing titanium are more preferred. Even more preferred are composite oxides of lithium and titanium (hereinafter abbreviated to "lithium-titanium composite oxides"). Namely, use of a lithium-titanium composite oxide having a spinel structure is especially preferred because incorporation of this composite oxide into a negative-electrode active material for non-aqueous-electrolyte batteries is effective in considerably reducing output resistance.

Also preferred are lithium-titanium composite oxides in which the lithium or titanium has been replaced by one or more other metallic elements, e.g., at least one element selected from the group consisting of Na, K, Co, Al, Fe, Ti, Mg, Cr, Ga, Cu, Zn, and Nb.

Such metal oxide preferably is a lithium-titanium composite oxide represented by general formula (1) wherein $0.7 \leq x \leq 1.5$, $1.5 \leq y \leq 2.3$, and $0 \leq z \leq 1.6$, because the structure thereof is stable during lithium ion doping/undoping.

$$Li_x Ti_y M_z O_4 \quad (1)$$

[In general formula (1), M represents at least one element selected from the group consisting of Na, K, Co, Al, Fe, Ti, Mg, Cr, Ga, Cu, Zn, and Nb.]

Of the compositions represented by general formula (1), structures represented by general formula (1) wherein
(a) $1.2 \leq x \leq 1.4$, $1.5 \leq y \leq 1.7$, and $z=0$
(b) $1.9 \leq x \leq 1.1$, $1.9 \leq y \leq 2.1$, and $z=0$ or
(c) $0.7 \leq x \leq 0.9$, $2.1 \leq y \leq 2.3$, and $z=0$
are especially preferred because these structures bring about a satisfactory balance among battery performances.

Especially preferred representative compositions of those compounds are: $Li_{4/3}Ti_{5/3}O_4$ for (a), $Li_1Ti_2O_4$ for (b), and $Li_{4/5}Ti_{11/5}O_4$ for (c). Preferred examples of the structure wherein $z \neq 0$ include $Li_{4/3}Ti_{4/3}Al_{1/3}O_4$.

<Properties of Carbonaceous Material>

In the case where a carbonaceous material is used as a negative-electrode active material, it is desirable that the carbonaceous material should have the following properties.

(X-Ray Parameter)

The carbonaceous material preferably has a value of d (interplanar spacing) for the lattice planes (002), as determined by X-ray diffractometry in accordance with the method of the Japan Society for Promotion of Scientific Research, of 0.335 nm or larger. The value of d thereof is generally 0.360 nm or less, preferably 0.350 nm or less, more preferably 0.345 nm or less. The crystallite size (Lc) of the carbonaceous material, as determined by X-ray diffractometry in accordance with the method of the Japan Society for Promotion of Scientific Research, is preferably 1.0 nm or larger, more preferably 1.5 nm or larger.

(Volume-Average Particle Diameter)

The volume-average particle diameter of the carbonaceous material, in terms of volume-average particle diameter (median diameter) as determined by the laser diffraction/scattering method, is generally 1 μm or more, preferably 3 μm or more, more preferably 5 μm or more, especially preferably 7 μm or more, and is generally 100 μm or less, preferably 50 μm or less, more preferably 40 μm or less, even more preferably 30 μm or less, especially preferably 25 μm or less.

When the volume-average particle diameter thereof is less than the lower limit of that range, there are cases where irreversible capacity increases, leading to a loss in initial battery capacity. When the volume-average particle diameter thereof exceeds the upper limit of that range, there are cases where such a carbonaceous material is undesirable from the standpoint of battery production because an uneven coating surface is apt to result when an electrode is produced through coating fluid application.

Volume-average particle diameter is determined by dispersing the carbon powder in a 0.2% by mass aqueous solution (about 10 mL) of poly(oxyethylene (degree of polymerization, 20)) sorbitan monolaurate as a surfactant and examining the dispersion with a laser diffraction/scattering type particle size distribution analyzer (LA-700, manufactured by HORIBA, Ltd.). The median diameter determined through this measurement is defined as the volume-average particle diameter of the carbonaceous material in the invention.

(Raman R Value, Raman Half-Value Width)

The Raman R value of the carbonaceous material as determined by the argon ion laser Raman spectroscopy is generally 0.01 or higher, preferably 0.03 or higher, more preferably 0.1 or higher, and is generally 1.5 or lower, preferably 1.2 or lower, more preferably 1 or lower, especially preferably 0.5 or lower.

When the Raman R value thereof is within that range, it is easy to avoid the trouble that the surface of the particles has too high crystallinity and the number of intercalation sites into which lithium comes with charge/discharge decreases, resulting in a decrease in suitability for charge. In addition, it is possible to prevent the trouble that when a coating fluid containing a carbonaceous material is applied to a current collector and the resultant coating is pressed to heighten the density of the negative electrode, then the crystals are apt to orient in directions parallel to the electrode plate and this leads to a decrease in load characteristics. Furthermore, it is easy to avoid the trouble that the surface of the particles has reduced crystallinity and enhanced reactivity with the nonaqueous electrolytic solution and this leads to a decrease in efficiency and enhanced gas evolution.

The Raman half-value width around 1,580 $cm^{-1}$ of the carbonaceous material is not particularly limited. However, the half-value width thereof is generally 10 $cm^{-1}$ or more, preferably 15 $cm^{-1}$ or more, and is generally 100 $cm^{-1}$ or less, preferably 80 $cm^{-1}$ or less, more preferably 60 $cm^{-1}$ or less, especially preferably 40 $cm^{-1}$ or less.

When the Raman half-value width thereof is within that range, it is easy to avoid the trouble that the surface of the particles has too high crystallinity and the number of intercalation sites into which lithium comes with charge/discharge decreases, resulting in a decrease in suitability for charge. In addition, it is possible to prevent the trouble that when a coating fluid containing a carbonaceous material is applied to a current collector and the resultant coating is pressed to heighten the density of the negative electrode, then the crystals are apt to orient in directions parallel to the electrode plate and this leads to a decrease in load characteristics. Furthermore, it is easy to avoid the trouble that the surface of the particles has reduced crystallinity and enhanced reactivity with the nonaqueous electrolytic solution and this leads to a decrease in efficiency and enhanced gas evolution.

The examination for a Raman spectrum is made with a Raman spectrometer (Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak PA around 1,580 $cm^{-1}$ and the intensity $I_B$ of a peak PB around 1,360 $cm^1$. The ratio between these intensities $R(R=I_B/I_A)$ is calculated. The Raman R value calculated through this examination is defined as the Raman R value of the carbonaceous material in the invention. Furthermore, the half-value width of the peak $P_A$ around 1,580 $cm^{-1}$ in the Raman spectrum obtained is measured, and this value is defined as the Raman half-value width of the carbonaceous material in the invention.

Conditions for the Raman spectroscopy are as follows.
Wavelength of argon ion laser: 514.5 nm
Laser power on sample: 15-25 mW
Resolution: 10-20 $cm^{-1}$
Examination range: 1,100 $cm^{-1}$ to 1,730 $cm^{-1}$
Analysis for Raman R value and Raman half-value width: background processing
Smoothing: simple average; convolution, 5 points (4) BET Specific Surface Area The BET specific surface area of the carbonaceous material, in terms of the value of specific surface area as determined by the BET method, is generally 0.1 $m^2 \cdot g^{-1}$ or larger, preferably 0.7 $m^2 \cdot g^{-1}$ or larger, more preferably 1.0 $m^2 \cdot g^{-1}$ or larger, especially preferably 1.5 $m^2 \cdot g^{-1}$ or larger, and is generally 100 $m^2 \cdot g^{-1}$ or smaller, preferably 25 $m^2 \cdot g^{-1}$ or smaller, more preferably 15 $m^2 \cdot g^{-1}$ or smaller, especially preferably 10 $m^2 \cdot g^{-1}$ or smaller.

When the BET specific surface area thereof is within that range, this carbonaceous material, when used as a negative-electrode material, readily accepts lithium during charge and inhibits lithium deposition from occurring on the electrode surface. Furthermore, when this carbonaceous material is used as a negative-electrode material, the reactivity thereof with the nonaqueous electrolytic solution is not so high and, hence, gas evolution is slight. A preferred battery therefore is easy to obtain.

The determination of specific surface area by the BET method is made with a surface area meter (a fully automatic surface area measuring apparatus manufactured by Ohkura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the carbonaceous material in the invention.

(Roundness)

When the carbonaceous material is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of carbonaceous-material particles having a particle diameter in the range of 3-40 µm, the more the particles are desirable. The roundness of the particles is desirably 0.1 or higher, preferably 0.5 or higher, more preferably 0.8 or higher, even more preferably 0.85 or higher, especially preferably 0.9 or higher. The higher the roundness, the more the high-current-density charge/discharge characteristics are improved. Consequently, when carbonaceous-material particles have a roundness within that range, the negative-electrode active material has improved suitability for loading and retains low interparticle resistance. Consequently, short-time high-current-density charge/discharge characteristics are less apt to decrease.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 µm are examined with the analyzer having a detection range set at 0.6-400 µm. The roundness determined through this measurement is defined as the roundness of the carbonaceous material in the invention.

Methods for improving roundness are not particularly limited. However, a carbonaceous material in which the particles have been rounded by a rounding treatment is preferred because this material gives an electrode in which the interstices among particles are uniform in shape. Examples of the rounding treatment include: a method in which shear force or compressive force is applied to thereby mechanically make the shape of the particles close to sphere; and a method of mechanical/physical treatment in which fine particles are aggregated into particles by means of the bonding force of a binder or of the fine particles themselves.

(Tap Density)

The tap density of the carbonaceous material is generally 0.1 g·cm$^{-3}$ or higher, preferably 0.5 g·cm$^{-3}$ or higher, more preferably 0.7 g·cm$^{-3}$ or higher, especially preferably 1 g·cm$^{-3}$ or higher, and is preferably 2.2 g·cm$^{-3}$ or less, more preferably 2.1 g·cm$^{-3}$ or less, especially preferably 2.0 g·cm$^{-3}$ or less. In the case where the tap density thereof is within that range, this carbonaceous material, when used in a negative electrode, can attain an increase in loading density to render a high-capacity battery easy to obtain. Furthermore, the amount of interparticle interstices in the electrode is not excessively small and, hence, electrical conductivity among the particles is ensured. Thus, it is easy to obtain preferred battery characteristics.

Tap density is determined by dropping a sample through a sieve having an opening size of 300 µm into a 20-cm$^3$ tapping cell to fill the cell with the sample up to the brim, subsequently conducting a tapping operation 1,000 times over a stroke length of 10 mm using a powder densimeter (e.g., Tap Denser, manufactured by Seishin Enterprise Co., Ltd.), and calculating the tap density from the resultant volume of the sample and the weight thereof. The tap density calculated through this measurement is defined as the tap density of the carbonaceous material in the invention.

(Orientation Ratio)

The orientation ratio of the carbonaceous material is generally 0.005 or greater, preferably 0.01 or greater, more preferably 0.015 or greater, and is generally 0.67 or less. When the orientation ratio thereof is within that range, it is easy to avoid the trouble that high-density charge/discharge characteristics decrease. The upper limit of that range is a theoretical upper limit of the orientation ratio of carbonaceous materials.

Orientation ratio is determined by X-ray diffractometry after a sample is molded by compaction. A molded object obtained by packing 0.47 g of a sample into a molding machine having a diameter of 17 mm and compacting the sample at 58.8 MN·m$^{-2}$ is set with clay on a sample holder for examination so as to be flush with the holder. This sample is examined for X-ray diffraction. From the intensities of the resultant (110) diffraction peak and (004) diffraction peak for the carbon, the ratio represented by (110) diffraction peak intensity/(004) diffraction peak intensity is calculated. The orientation ratio calculated through this measurement is defined as the orientation ratio of the carbonaceous material in the invention.

Conditions for the X-ray diffractometry are as follows. Incidentally, "2θ" represents diffraction angle.
Target: Cu (Kα line) graphite monochromator
Slits:
Divergence slit=0.5 degrees
Receiving slit=0.15 mm
Scattering slit=0.5 degrees
Examination range and step angle/measuring time:

| | |
|---|---|
| (110) plane: 75° ≤ 2θ ≤ 80° | 1°/60 sec |
| (004) plane: 52° ≤ 2θ ≤ 57° | 1°/60 sec |

(Aspect Ratio (Powder))

The aspect ratio of the carbonaceous material is generally 1 or greater, and is generally 10 or less, preferably 8 or less, more preferably 5 or less. When the aspect ratio thereof is within that range, it is easy to avoid the trouble that the carbonaceous material causes streak lines in electrode plate formation and an even coating surface cannot be obtained, resulting in a decrease in high-current-density charge/discharge characteristics. Incidentally, the lower limit of that range is a theoretical lower limit of the aspect ratio of carbonaceous materials.

In determining aspect ratio, particles of the carbonaceous material are examined with a scanning electron microscope with enlargement. Fifty are arbitrarily selected from graphite particles fixed to an edge face of a metal having a thickness of 50 µm or smaller, and each particle is examined in a three-dimensional manner while rotating and inclining the stage to which the sample is fixed. In this examination, the length of the longest axis A of each carbonaceous-material particle and the length of the shortest axis B perpendicular to that axis are measured, and the average of the A/B values is determined. The aspect ratio (A/B) determined through this measurement is defined as the aspect ratio of the carbonaceous material in the invention.

<Configuration of Negative Electrode and Method of Production Thereof>

Any known method can be used for electrode production unless this considerably lessens the effects of the invention. For example, a binder and a solvent are added to a negative-electrode active material optionally together with a thickener, conductive material, filler, etc. to obtain a slurry and this slurry is applied to a current collector and dried. Thereafter, the coated current collector is pressed. Thus, an electrode can be formed.

In the case where an alloy material is employed, use may be made of a method in which a thin-film layer containing the negative-electrode active material described above (negative-electrode active-material layer) is formed by a technique such as vapor deposition, sputtering, or plating.

(Current Collector)

As the current collector for holding the negative-electrode active material, a known current collector can be used at will. Examples of the current collector for the negative electrode include metallic materials such as copper, nickel, stainless steel, and nickel-plated steel. Copper is especially preferred from the standpoints of processability and cost.

In the case where the current collector is a metallic material, examples of the shape of the current collector include metal foils, metal cylinders, metal coils, metal plates, thin metal films, expanded metals, punching metals, and metal foam. Preferred of these are thin metal films. More preferred are copper foils. Even more preferred are a rolled copper foil, which is produced by the rolling process, and an electrolytic copper foil, which is produced by the electrolytic process. Either of these can be used as a current collector.

The thickness of the current collector is generally 1 μm or more, preferably 5 μm or more, and is generally 100 μm or less, preferably 50 μm or less. When the thickness of the negative-electrode current collector is within that range, the current collector does not considerably reduce the capacity of the whole battery and is easy to handle.

(Thickness Ratio Between Current Collector and Negative-Electrode Active-Material Layer)

The thickness ratio between the current collector and the negative-electrode active-material layer is not particularly limited. However, the value of "(thickness of the negative-electrode active-material layer on one surface just before impregnation with nonaqueous electrolytic solution)/(thickness of the current collector)" is preferably 150 or less, more preferably 20 or less, especially preferably 10 or less, and is preferably 0.1 or greater, more preferably 0.4 or greater, especially preferably 1 or greater. When the thickness ratio between the current collector and the negative-electrode active-material layer is within that range, this current collector is less apt to be heated up by Joule's heat during high-current-density charge/discharge. Furthermore, it is easy to avoid the trouble that the proportion by volume of the current collector to the negative-electrode active material increases to reduce the capacity of the battery.

(Binder)

The binder for binding the negative-electrode active material is not particularly limited so long as it is stable to the nonaqueous electrolytic solution and to the solvent to be used for electrode production.

Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these binders may be used alone, or two or more thereof may be used in any desired combination and proportion.

The proportion of the binder to the negative-electrode active material is preferably 0.1% by mass or higher, more preferably 0.5% by mass or higher, especially preferably 0.6% by mass or higher, and is preferably 20% by mass or lower, more preferably 15% by mass or lower, even more preferably 10% by mass or lower, especially preferably 8% by mass or lower. When the proportion of the binder to the negative-electrode active material is within that range, it is easy to avoid the trouble that the proportion of the binder which does not contribute to battery capacity increases and this leads to a decrease in battery capacity. Furthermore, the negative electrode is inhibited from having a reduced strength.

Especially when the binder includes a rubbery polymer represented by SBR as the main component, the proportion of this binder to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower. In the case where the binder includes a fluorochemical polymer represented by poly(vinylidene fluoride) as the main component, the proportion of this binder to the negative-electrode active material is generally 1% by mass or higher, preferably 2% by mass or higher, more preferably 3% by mass or higher, and is generally 15% by mass or lower, preferably 10% by mass or lower, more preferably 8% by mass or lower.

(Solvent for Slurry Formation)

The kind of the solvent to be used for forming a slurry is not particularly limited so long as the negative-electrode active material and binder and the thickener and conductive material which are optionally used according to need can be dissolved or dispersed therein. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane.

Especially when an aqueous solvent is used, it is preferred to add a dispersant or the like in combination with a thickener and prepare a slurry using a latex of, for example, SBR. One of those solvents may be used alone, or two or more thereof may be used in any desired combination and proportion.

(Thickener)

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or two or more thereof may be used in any desired combination and proportion.

In the case where such a thickener is further added, the proportion of the thickener to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower.

When the proportion of the thickener to the negative-electrode active material is lower than the lower limit of that range, there are cases where applicability decreases considerably. When the proportion thereof is within that range, the proportion of the negative-electrode active material in the negative-electrode active-material layer is appropriate, and it is easy to avoid the problem that battery capacity decreases and the trouble that resistance among the particles of the negative-electrode active material increases.

(Electrode Density)

When the negative-electrode active material is used to form an electrode, the electrode structure is not particularly limited. However, the density of the negative-electrode active material present on the current collector is preferably 1 g·cm$^{-3}$ or higher, more preferably 1.2 g·cm$^{-3}$ or higher, especially preferably 1.3 g·cm$^{-3}$ or higher, and is preferably 2 g·cm$^{-3}$ or less, more preferably 1.9 g·cm$^{-3}$ or less, even more preferably 1.8 g·cm$^{-3}$ or less, especially preferably 1.7 g·cm$^{-3}$ or less. When the density of the negative-electrode active material present on the current collector is within that range, it is easy to avoid the trouble that the negative-electrode active-material particles are broken and this increases the initial irreversible capacity and reduces the infiltration of a nonaqueous electrolytic solution into around the current collector/negative-electrode active material interface, resulting in a deterioration in high-current-density charge/discharge characteristics. Furthermore, it is also possible to avoid the trouble that electrical conductivity among the negative-electrode active-material particles decreases and this increases battery resistance, resulting in a decrease in capacity per unit volume.

(Thickness of Negative-Electrode Plate)

The thickness of the negative-electrode plate is designed so as to be suited for the positive-electrode plate to be used, and is not particularly limited. However, it is desirable that the thickness of the mix layer, i.e., the thickness of the negative-electrode plate excluding the metal foil serving as a core, should be generally 15 μm or more, preferably 20 μm or more, more preferably 30 μm or more, and be generally 150 μm or less, preferably 120 μm or less, more preferably 100 μm or less.

[Positive Electrode]

The positive electrode to be used in each of the lithium secondary batteries of the invention is explained below.

[Positive-Electrode Active Material]

The positive-electrode active material to be used in the positive electrode is described below.

(Composition)

The nonaqueous-electrolyte batteries of the invention are equipped with a positive-electrode active material including, as a basic composition, a lithium-containing phosphoric acid compound represented by $Li_xMPO_4$ (wherein M is at least one element selected from the group consisting of Group-2 to Group-12 metals of the periodic table, and x satisfies $0<x\leq1.2$).

The lithium-containing phosphoric acid compound preferably is a compound represented by $Li_xMPO_4$ (wherein M is at least one element selected from the group consisting of the Group-4 to Group-11 transition metals in the fourth period of the periodic table, and x satisfies $0<x\leq1.2$).

It is preferred that M in the formula $Li_xMPO_4$ should be at least one element selected from the group consisting of Mg, Zn, Ca, Cd, Sr, Ba, Co, Ni, Fe, Mn, and Cu. It is more preferred that M should be at least one element selected from the group consisting of Co, Ni, Fe, and Mn. Of these phosphoric acid compounds, iron lithium phosphate of an olivine structure having the basic composition $LiFePO_4$ is especially suitable because this compound is less apt to suffer metal dissolution when in a high-temperature charged state and is inexpensive.

The expression "including $Li_xMPO_4$ as a basic composition" used above means that not only compounds having a composition represented by the empirical formula but also compounds in which the Fe or other sites in the crystal structure have been partly replaced by another element are included. Furthermore, that expression means that not only compounds having the stoichiometric composition but also compounds having non-stoichiometric compositions which include, for example, sites where part of the elements is deficient are included. It is preferred that the element which replaces should be an element such as Al, Ti, V, Cr, Mn, Fe, Co, Li, Ni, Cu, Zn, Mg, Ga, Zr, or Si. In the case where replacement by such an element is conducted, the degree of replacement is preferably 0.1-5 mol %, more preferably 0.2-2.5 mol %.

Although the positive-electrode active material includes the $Li_xMPO_4$ as a main component, it is possible to use this compound in combination with a lithium-transition metal composite oxide such as, for example, a lithium-manganese composite oxide, lithium-cobalt composite oxide, lithium-nickel composite oxide, lithium-nickel-cobalt composite oxide, lithium-nickel-manganese composite oxide, or lithium-nickel-manganese-cobalt composite oxide. It is preferred that the positive-electrode active material includes the $Li_xMPO_4$ in an amount of 20 wt % or more. In this case, the charge/discharge cycle characteristics of the nonaqueous-electrolyte battery can be further improved. It is more preferred that the content of the $Li_xMPO_4$ should be 40 wt % or higher.

It is also possible to use two or more compounds represented by $Li_xMPO_4$ in combination. Preferred examples of such combinations include: $Li_xFePO_4$ and $Li_xMnPO_4$; $Li_xFePO_4$ and $Li_xCoPO_4$; and $Li_xFePO_4$ and $Li_xNiPO_4$. Use of such a combination can improve battery operating voltage while maintaining safety. An especially preferred combination among these is a combination of $Li_xFePO_4$ and $Li_xMnPO_4$, because this combination brings about excellent durability, such as high-temperature storability and cycle characteristics, besides the improvements in safety and battery operating voltage.

(Surface Coating)

As a positive-electrode active material, use may be made of a material composed of $Li_xMPO_4$ and, adherent to the surface thereof, a substance having a composition different therefrom. Examples of the surface-adherent substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, carbonates such as lithium carbonate, calcium carbonate, and magnesium carbonate, and carbon.

Those surface-adherent substances each can be adhered to the surface of the positive-electrode active material, for example, by: a method in which the substance is dissolved or suspended in a solvent and this solution or suspension is infiltrated into the positive-electrode active material and then dried; a method in which a precursor for the surface-adherent substance is dissolved or suspended in a solvent and this solution or suspension is infiltrated into the positive-electrode active material and then heated or otherwise treated to react the precursor; or a method in which the substance is added to a precursor for the positive-electrode active material and heat-treated together with the precursor. In the case where carbon is to be adhered, use may be made of a method in which a carbonaceous substance is mechanically adhered later in the form of, for example, activated carbon or the like.

With respect to the amount of the surface-adherent substance to be used, the lower limit of the amount thereof, in terms of mass ppm of the positive-electrode active material, is preferably 0.1 ppm or more, more preferably 1 ppm or more, even more preferably 10 ppm or more. The upper limit thereof is preferably 20% or less, more preferably 10% or less, even more preferably 5% or less, in terms of mass % based on the positive-electrode active material. The surface-adherent substance can inhibit the electrolytic solution from undergoing an oxidation reaction on the surface of the positive-electrode active material, and an improvement in battery life can hence be attained. This effect is enhanced when the substance has been adhered in an appropriate amount.

In the invention, a material composed of a positive-electrode active material made of $Li_xMPO_4$ and, adherent to the surface thereof, a substance having a composition different from the composition of the active material is also referred to as "positive-electrode active material".

(Shape)

The shape of the particles of the positive-electrode active material in the invention may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape. In electrochemical elements, the active material in each electrode usually expands/contracts with the charge/discharge of the element and, hence, a deterioration, such as active-material breakage or conduction path breakage, that is caused by the resultant stress is apt to occur. Consequently, a positive-electrode active material in which the primary particles have aggregated to form secondary particles is preferable to an active material composed of primary particles only since the particles in the former active material relieve the stress caused by expansion/contraction to prevent the deterioration. Furthermore, particles of a spherical or ellipsoidal shape are preferable to particles showing axial orientation, e.g., platy particles, because the former particles are less apt to orient during electrode forming and hence this electrode is reduced in expansion/contraction during charge/discharge, and because these particles are apt to be evenly mixed with a conductive material in electrode production.

(Tap Density)

The tap density of the positive-electrode active material is preferably 0.1 g/cm³ or higher, more preferably 0.2 g/cm³ or higher, even more preferably 0.3 g/cm³ or higher, most preferably 0.4 g/cm³ or higher. In case where the tap density of the positive-electrode active material is lower than the lower limit of that range, not only it is necessary to use a larger amount of a dispersion medium and larger amounts of a conductive material and a binder in forming a positive-electrode active-material layer, but also there are cases where the loading of the positive-electrode active material in the positive-electrode active-material layer is limited, resulting in a limited battery capacity. By using a composite-oxide power having a high tap density, a positive-electrode active-material layer having a high density can be formed. The higher the tap density, the more the positive-electrode active material is generally preferred. There is no particular upper limit on the tap density. However, when the tap density thereof is too high, there are cases where the diffusion of lithium ions in the positive-electrode active-material layer through the electrolytic solution as a medium becomes a rate-determining stage and this is apt to reduce load characteristics. Consequently, the upper limit thereof is preferably 2.0 g/cm³ or lower, more preferably 1.8 g/cm³ or lower.

In the invention, the tap density of a positive-electrode active-material powder is determined by placing 5-10 g of the powder in a 10-mL measuring cylinder made of glass, conducting a tapping operation 200 times over a stroke of about 20 mm, and determining the density of the thus-densified powder (tap density) in terms of g/cc.

(Median Diameter $d_{50}$)

The median diameter $d_{50}$ (secondary-particle diameter in the case where the primary particles have aggregated to form secondary particles) of the particles of the positive-electrode active material is preferably 0.1 µm or more, more preferably 0.2 µm or more, even more preferably 0.3 µm or more, most preferably 2 µm or more. The upper limit thereof is preferably 20 µm or less, more preferably 18 µm or less, even more preferably 16 µm or less, most preferably 15 µm or less. When the median diameter $d_{50}$ thereof is less than the lower limit, there are cases where a product having a high tap density cannot be obtained. In case where the median diameter thereof exceeds the upper limit, lithium diffusion within individual particles requires a longer period and this results in a decrease in battery performance. In addition, there are cases where when such positive-electrode active-material particles are used in producing a positive electrode for batteries, i.e., when the active material and other ingredients including a conductive material and a binder are slurried with a solvent and this slurry is applied in a thin-film form, then the active material poses a problem, for example, that streak lines generate. It is possible to further improve loading during positive-electrode production by mixing two or more positive-electrode active materials differing in median diameter $d_{50}$.

Median diameter $d_{50}$ in the invention is determined with a known laser diffraction/scattering type particle size distribution analyzer. In the case where LA-920, manufactured by HORIBA Ltd., is used as a particle size distribution analyzer, a 0.1% by mass aqueous solution of sodium hexametaphosphate is used as a dispersion medium for measurement to conduct a 5-minute ultrasonic dispersing treatment, before the particles are examined at a measuring refractive index set at 1.24.

(Average Primary-Particle Diameter)

In the case where the primary particles have aggregated to form secondary particles, the average primary-particle diameter of this positive-electrode active material is preferably 0.02 µm or more, more preferably 0.03 µm or more, even more preferably 0.05 µm or more. The upper limit thereof is preferably 2 µm or less, more preferably 1.6 µm or less, even more preferably 1.3 µm or less, most preferably 1 µm or less. When the average primary-particle diameter thereof is within that range, spherical secondary particles are apt to be formed. It is hence easy to avoid the trouble that the shape of secondary particles adversely affects powder loading or results in a considerably reduced specific surface area, resulting in a higher possibility that battery performance, such as output characteristics, might decrease. Furthermore, since crystal growth is insufficient, this positive-electrode active material is less apt to pose problems such as, for example, poor charge/discharge reversibility.

Average primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged to determine the average value.

(BET Specific Surface Area)

The BET specific surface area of the positive-electrode active material to be used in the secondary batteries of the invention is preferably 0.4 m$^2$/g or larger, more preferably 0.5 m$^2$/g or larger, even more preferably 0.6 m$^2$/g or larger. The upper limit thereof may be 50 m$^2$/g or smaller, preferably 40 m$^2$/g or smaller, even more preferably 30 m$^2$/g or smaller. When the BET specific surface area thereof is within that range, battery performance can be inhibited from decreasing and satisfactory applicability is obtained when a positive-electrode active-material layer is formed.

BET specific surface area is measured with a surface area meter (a fully automatic surface area measuring apparatus manufactured by Ohkura Riken Co., Ltd.) in the following manner. A sample is preliminarily dried at 150° C. for 30 minutes in a nitrogen stream, and the specific surface area thereof is thereafter determined by the gas-flowing nitrogen adsorption BET one-point method using a nitrogen/helium mixture gas precisely regulated so as to have a nitrogen pressure of 0.3 relative to atmosphere pressure. The value determined through this measurement is defined as the BET specific surface area of the positive-electrode active material.

(Processes for Production)

For producing the positive-electrode active material, techniques which are in general use as processes for producing inorganic compounds may be used. Especially for producing a spherical or ellipsoidal active material, various techniques may be used. Examples thereof include a method which includes dissolving or pulverizing/dispersing a phosphorus source, e.g., phosphoric acid, and a source of the M as a component of Li$_x$MPO$_4$ in a solvent, e.g., water, regulating the pH of the solution or dispersion with stirring to produce a spherical precursor, recovering and optionally drying the precursor, subsequently adding thereto a lithium source, e.g., LiOH, Li$_2$CO$_3$, or LiNO$_3$, and burning the mixture at a high temperature to obtain the active material.

For producing the positive electrode to be used in the invention, one positive-electrode active material represented by Li$_x$MPO$_4$ and/or one positive-electrode active material Li$_x$MPO$_4$ coated with the surface-adherent substance may be used alone, or may be used together with one or more such materials differing in composition in any desired combination or proportion. Here, the proportion of the positive-electrode active material Li$_x$MPO$_4$ and/or the positive-electrode active material Li$_x$MPO$_4$ coated with the surface-adherent substance is preferably 30% by mass or higher, more preferably 50% by mass or higher, based on all positive-electrode active materials. When the proportion of the positive-electrode active material Li$_x$MPO$_4$ and/or the positive-electrode active material Li$_x$MPO$_4$ coated with the surface-adherent substance is within that range, a preferred battery capacity can be provided.

Incidentally, "the positive-electrode active material Li$_x$MPO$_4$ and/or the positive-electrode active material Li$_x$MPO$_4$ coated with the surface-adherent substance" and "positive-electrode active materials other than the positive-electrode active material Li$_x$MPO$_4$ and/or the positive-electrode active material Li$_x$MPO$_4$ coated with the surface-adherent substance" are inclusively referred to as "positive-electrode active material".

[Configuration of Positive Electrode]

The configuration of the positive electrode to be used in the invention is described below.

(Electrode Structure and Production Process)

The positive electrode to be used in the lithium secondary batteries of the invention is produced by forming a positive-electrode active-material layer including a positive-electrode active material and a binder on a current collector. Namely, the positive electrode for the lithium secondary batteries of the invention is produced by forming a positive-electrode active-material layer including the positive-electrode active material and a binder on a current collector. The production of the positive electrode using a positive-electrode active material can be conducted in an ordinary manner. Namely, a positive-electrode active material and a binder are mixed together by a dry process optionally together with a conductive material, thickener, etc. and this mixture is formed into a sheet and press-bonded to a positive-electrode current collector. Alternatively, those materials are dissolved or dispersed in a liquid medium to obtain a slurry and this slurry is applied to a positive-electrode current collector and dried. Thus, a positive-electrode active-material layer is formed on the current collector, and the positive electrode can be thereby obtained.

In the positive-electrode active-material layer, the content of the positive-electrode active material for use in the positive electrodes of the lithium secondary batteries of the invention is preferably 80% by mass or higher, more preferably 82% by mass or higher, especially preferably 84% by mass or higher. The upper limit thereof is preferably 97% by mass or lower, more preferably 95% by mass or lower. When the content of the positive-electrode active material in the positive-electrode active-material layer is within that range, an excellent balance between electrical capacity and the strength of the positive electrode is obtained.

It is preferred that the positive-electrode active-material layer obtained by coating fluid application and drying should be pressed and densified with a handpress, roller press, or the like in order to heighten the loading density of the positive-electrode active material. The lower limit of the loading density of the positive-electrode active-material layer is preferably 1.3 g/cm$^3$ or higher, more preferably 1.4 g/cm$^3$ or higher, even more preferably 1.5 g/cm$^3$ or higher. The upper limit thereof is preferably 3.0 g/cm$^3$ or less, more preferably 2.5 g/cm$^3$ or less, even more preferably 2.3 g/cm$^3$ or less.

When the density of the positive-electrode active-material layer is within that range, it is easy to avoid the trouble that an electrolytic solution shows insufficient infiltration into around the current collector/active material interface and charge/discharge characteristics especially at a high current density decrease, making it impossible to obtain high output, and the trouble that electrical conductivity among the active-material particles decreases to increase battery resistance, making it impossible to obtain high output.

(Conductive Material)

As the conductive material, a known conductive material can be used at will. Examples thereof include metallic materials such as copper and nickel; graphites such as natural graphites and artificial graphites; carbon blacks such as acetylene black; and carbon materials such as amorphous carbon, e.g., needle coke. One of these materials may be used alone, or two or more thereof may be used in any desired combination and proportion. The conductive material may be used so that the material is incorporated in the positive-electrode active-material layer in an amount of generally 0.01% by mass or more, preferably 0.1% by mass or more, more preferably 1% by mass or more, the upper limit thereof being generally 50% by mass or less, preferably 30% by mass or less, more preferably 15% by mass or less. When the content thereof is within that range, electrical conductivity can be sufficiently ensured and a preferred battery capacity can be provided.

(Binder)

The binder to be used for producing the positive-electrode active-material layer is not particularly limited. In the case where the layer is to be formed through coating fluid application, any binder may be used so long as it is a material which is soluble or dispersible in the liquid medium for use in electrode production. Examples thereof include resinous polymers such as polyethylene, polypropylene, poly(ethylene terephthalate), poly(methyl methacrylate), polyimides, aromatic polyamides, cellulose, and nitrocellulose; rubbery polymers such as SBR (styrene/butadiene rubbers), NBR (acrylonitrile/butadiene rubbers), fluororubbers, isoprene rubbers, butadiene rubbers, and ethylene/propylene rubbers; thermoplastic elastomeric polymers such as styrene/butadiene/styrene block copolymers or products of hydrogenation thereof, EPDM (ethylene/propylene/diene terpolymers), styrene/ethylene/butadiene/ethylene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride) (PVdF), polytetrafluoroethylene, fluorinated poly(vinylidene fluoride), and polytetrafluoroethylene/ethylene copolymers; and polymer compositions having the property of conducting alkali metal ions (especially lithium ions). One of these substances may be used alone, or two or more thereof may be used in any desired combination and proportion.

The proportion of the binder in the positive-electrode active-material layer is generally 0.1% by mass or higher, preferably 1% by mass or higher, more preferably 3% by mass or higher. The upper limit thereof is generally 80% by mass or lower, preferably 60% by mass or lower, more preferably 40% by mass or lower, most preferably 10% by mass or lower. When the proportion of the binder is within that range, the positive-electrode active material can be sufficiently held and, hence, a suitable mechanical strength of the positive electrode can be provided, making it possible to provide battery performance including excellent cycle characteristics, without causing a decrease in battery capacity or electrical conductivity.

(Liquid Medium)

The kind of the liquid medium to be used for forming a slurry is not particularly limited so long as the liquid medium is a solvent in which the positive-electrode active material, conductive material, and binder and a thickener, which is used according to need, can be dissolved or dispersed. Either an aqueous solvent or an organic solvent may be used. Examples of the aqueous medium include water and mixed solvents composed of an alcohol and water. Examples of the organic medium include aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether, propylene oxide, and tetrahydrofuran (THF); amides such as N-methylpyrrolidone (NMP), dimethylformamide, and dimethylacetamide; and aprotic polar solvents such as hexamethylphosphoramide and dimethyl sulfoxide.

Especially when an aqueous medium is used, it is preferred to use a thickener and a latex of, for example, a styrene/butadiene rubber (SBR) to prepare a slurry. A thickener is used generally for the purpose of regulating the viscosity of the slurry. The thickener is not particularly limited, and examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or two or more thereof may be used in any desired combination and proportion. In the case where such a thickener is further added, the proportion of the thickener to the active material may be 0.1% by mass or higher, preferably 0.5% by mass or higher, more preferably 0.6% by mass or higher, and the upper limit thereof may be 5% by mass or lower, preferably 3% by mass or lower, more preferably 2% by mass or lower. When the proportion thereof is within that range, satisfactory applicability is obtained and the proportion of the active material in the positive-electrode active-material layer is not excessively low. It is therefore easy to avoid the problem that battery capacity decreases and the trouble that resistance among particles of the positive-electrode active material increases.

(Current Collector)

The material of the positive-electrode current collector is not particularly limited, and a known one can be used at will. Examples thereof include metallic materials such as aluminum, stainless steel, nickel-plated materials, titanium, and tantalum; and carbon materials such as carbon cloths and carbon papers. Of these, metallic materials are preferred. Especially preferred is aluminum.

In the case of a metallic material, examples of the shape of the current collector include metal foils, metal cylinders, metal coils, metal plates, thin metal films, expanded metals, punching metals, and metal foam. In the case of a carbon material, examples of the collector shape include carbon plates, thin carbon films, and carbon cylinders. Of these, a thin metal film is preferred. The thin film may be in a suitable mesh form. Although the thin film may have any desired thickness, the thickness thereof is generally 1 μm or more, preferably 3 μm or more, more preferably 5 μm or more. The upper limit thereof is generally 1 mm or less, preferably 100 μm or less, more preferably 50 μm or less. When the thin film has a thickness within that range, this thin film can have the strength required of a current collector and is easy to handle.

Furthermore, use of a material composed of a current collector and, formed on the surface thereof, an electroconductive layer differing in compound composition from the current collector is also preferred from the standpoint of lowering the resistance of electronic contact between the current collector and the positive-electrode active-material layer. Examples of the electroconductive layer differing in compound composition from the current collector include electroconductive layers formed from carbonaceous materials, electroconductive polymers, and noble metals such as gold, platinum, and silver.

The thickness ratio between the current collector and the positive-electrode active-material layer is not particularly limited. However, the value of (thickness of the positive-electrode active-material layer on one surface just before impregnation with electrolytic solution)/(thickness of the current collector) is preferably 20 or less, more preferably 15 or less, most preferably 10 or less, and the lower limit thereof is preferably 0.5 or greater, more preferably 0.8 or greater, most preferably 1 or greater. When the thickness ratio is within that range, it is easy to avoid the trouble that the current collector is heated up by Joule's heat during high-currentdensity charge/discharge or that the proportion by volume of the current collector to the positive-electrode active material increases to reduce the capacity of the battery.

(Electrode Area)

In the case where a nonaqueous electrolytic solution of the invention is used, it is preferred to regulate the positive-electrode active-material layer so as to have a larger area than the area of the outer surface of the battery case, from the standpoints of high output and enhanced high-temperature stability. Specifically, the total area of the positive electrode is preferably at least 15 times, more preferably at least 40 times, the surface area of the case of the secondary battery. In the case of a bottomed prismatic shape, the term "area of the outer surface of the case" means the total area calculated from the length, width, and thickness dimensions of the case part packed with the power generation elements excluding the projecting parts of the terminals. In the case of a bottomed cylindrical shape, that term means a geometrical surface area obtained by approximating to a cylinder the case part packed with the power generation elements excluding the projecting parts of the terminals. The term "total area of the positive electrode" means the geometrical surface area of the positive-electrode mix layer which faces the mix layer containing a negative-electrode active material. In the case of a structure obtained by forming a positive-electrode mix layer on each of both surfaces of a current collector foil, that term means the sum of the areas separately calculated for the respective surfaces.

(Thickness of Positive-Electrode Plate)

The thickness of the positive-electrode plate is not particularly limited. However, from the standpoints of high capacity and high output, the thickness of the mix layer, i.e., the thickness of the positive-electrode plate excluding the metal foil serving as a core, for one surface of the current collector is as follows. The lower limit thereof is preferably 10 µm or more, more preferably 20 µm or more, and the upper limit thereof is preferably 500 µm or less, more preferably 400 µm or less.

[Separator]

A separator is generally interposed between the positive electrode and the negative electrode in order to prevent short-circuiting. In this case, a nonaqueous electrolytic solution of this invention is usually infiltrated into the separator.

The material and shape of the separator are not particularly limited, and known separators can be employed at will unless the effects of the invention are considerably lessened thereby. In particular, use may be made of separators constituted of materials stable to the nonaqueous electrolytic solutions of the invention, such as resins, glass fibers, and inorganic materials. It is preferred to use a separator which is in the form of a porous sheet, nonwoven fabric, or the like and has excellent liquid retentivity.

As the material of the resinous or glass-fiber separators, use can be made of, for example, polyolefins such as polyethylene and polypropylene, polytetrafluoroethylene, polyethersulfones, glass filters, and the like. Preferred of these are glass filters and polyolefins. More preferred are polyolefins. One of these materials may be used alone, or two or more thereof may be used in any desired combination and proportion.

The separator may have any desired thickness. However, the thickness thereof is generally 1 µm or more, preferably 5 µm or more, more preferably 10 µm or more, and is generally 50 µm or less, preferably 40 µm or less, more preferably 30 µm or less. When the thickness of the separator is within that range, neither insulating properties nor mechanical strength decreases, and the battery is less apt to suffer a decrease in battery performance, e.g., rate characteristics, or a decrease in the energy density of the nonaqueous-electrolyte battery as a whole.

In the case where a porous material such as, e.g., a porous sheet or nonwoven fabric is used as the separator, this separator may have any desired porosity. However, the porosity thereof is generally 20% or higher, preferably 35% or higher, more preferably 45% or higher, and is generally 90% or lower, preferably 85% or lower, more preferably 75% or lower. When the porosity thereof is within that range, this separator does not have excessively high film resistance, and preferred rate characteristics can be provided. Furthermore, this separator does not have reduced mechanical strength, and preferred insulating properties also can be provided.

The separator may have any desired average pore diameter. However, the average pore diameter thereof is generally 0.5 µm or less, preferably 0.2 µm or less, and is generally 0.05 µm or more. When the average pore diameter thereof is within that range, short-circuiting is less apt to occur, and this separator does not have excessively high film resistance and can provide preferred rate characteristics.

On the other hand, examples of the inorganic materials which may be used include oxides such as alumina and silicon dioxide, nitrides such as aluminum nitride and silicon nitride, and sulfates such as barium sulfate and calcium sulfate. Such materials of a particulate shape or fibrous shape may be used.

With respect to form, a separator of a thin film form may be used, such as nonwoven fabric, woven fabric, or microporous film. Suitable separators of a thin film form have a pore diameter of 0.01-1 µm and a thickness of 5-50 µm. Besides such a separator in an independent thin film form, use can be made of a separator obtained by forming a composite porous layer containing particles of the inorganic material using a resinous binder on a surface layer of the positive electrode and/or negative electrode. Examples thereof include to form a porous layer from alumina particles having a 90% particle diameter smaller than 1 µm on both surfaces of the positive electrode using a fluororesin as a binder.

[Battery Design]

<Electrode Group>

The electrode group may be either of: an electrode group having a multilayer structure in which the positive-electrode plate and negative-electrode plate have been superposed through the separator; and an electrode group having a wound structure in which the positive-electrode plate and negative-electrode plate have been spirally wound through the separator. The proportion of the volume of the electrode group to the internal volume of the battery (hereinafter referred to as electrode group proportion) is generally 40% or higher, preferably 50% or higher, and is generally 90% or lower, preferably 80% or lower.

When the electrode group proportion is within that range, not only a preferred battery capacity can be provided, but also a moderate space volume can be ensured. Consequently, this battery does not undergo an excessive increase in internal pressure, even when the battery is heated up to cause members to expand or a liquid component of the electrolyte to have a heightened vapor pressure. It is therefore easy to avoid the trouble that the battery is reduced in various characteristics including charge/discharge cycling performance and high-temperature storability, and the trouble that gas release valve, which releases the internal pressure, works.

<Structure for Current Collection>

The structure for current collection is not particularly limited. However, for more effectively attaining the improvement in high-current density charge/discharge characteristics which is brought about by the nonaqueous electrolytic solutions of this invention, it is preferred to employ a structure reduced in the resistance of wiring parts and joint parts. In the case where internal resistance has been reduced in this manner, use of the nonaqueous electrolytic solutions of the invention produces the effects thereof especially satisfactorily.

In the case of an electrode group assembled into the multilayer structure described above, a structure obtained by bundling the metallic core parts of respective electrode layers and welding the bundled parts to a terminal is suitable. When each electrode has a large area, this results in increased internal resistance. In this case, it is preferred to dispose a plurality of terminals in each electrode to reduce the resistance. In the case of an electrode group having the wound structure described above, a plurality of lead structures may be disposed on each of the positive electrode and negative electrode and bundled into a terminal. Thus, internal resistance can be reduced.

<Protective Element>

Examples of the protective element include a PTC (positive temperature coefficient), which increases in resistance upon abnormal heating-up or when an excessive current flows, a temperature fuse, a thermister, and a valve (current breaker valve) which, upon abnormal heating-up, breaks the current flowing through the circuit, on the basis of an abrupt increase in the internal pressure or internal temperature of the battery. It is preferred to select such a protective element which does not work under ordinary high-current use conditions. It is more preferred to employ a design which prevents abnormal heating-up and thermal run-away even without a protective element.

<Case>

The nonaqueous-electrolyte batteries of the invention each are usually fabricated by housing the nonaqueous electrolytic solution, negative electrode, positive electrode, separator, etc. in a case. This case is not particularly limited, and a known case can be employed at will unless this considerably lessens the effects of the invention. Specifically, although the case may be made of any desired material, use is generally made of a metal such as nickel-plated iron, stainless steel, aluminum or an alloy thereof, nickel, titanium, or a magnesium alloy or a laminated film composed of a resin and an aluminum foil. From the standpoint of weight reduction, a metal which is aluminum or an aluminum alloy or a laminated film is suitable.

Examples of the case obtained using any of those metals include: a case formed by fusion-bonding a metal to itself by laser welding, resistance welding, or ultrasonic welding to constitute a sealed structure; or a case formed by caulking any of those metals through a resinous gasket. Examples of the case obtained using the laminated film include a case having a sealed structure formed by thermally fusion-bonding the resin layer to itself. A resin different from the resin used in the laminated film may be interposed between the resin layers in order to enhance sealing properties. Especially when a sealed structure is to be formed by thermally fusion-bonding resin layers through current-collector terminals, then metal/resin bonding is involved and, hence, a resin having polar groups or a modified resin into which polar groups have been incorporated is suitable for use as the resin to be interposed.

The case may have any desired shape. For example, the case may be any of the cylindrical type, prismatic type, laminate type, coin type, large type, and the like.

EXAMPLES

The invention will be explained below in more detail by reference to Examples and Comparative Examples. However, the invention should not be construed as being limited to the following Examples unless the invention departs from the spirit thereof Example 1

Production of Negative Electrode

To 98 parts by weight of artificial-graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to one surface of a copper foil having a thickness of 10 μm and dried. This coated foil was rolled with a pressing machine to a thickness of 75 μm, and a piece of a shape having an active-material layer size with a width of 30 mm and a length of 40 mm and having an uncoated area with a width of 5 mm and a length of 9 mm was cut out of the rolled sheet. Thus, a negative electrode was obtained.

[Production of Positive Electrode]

Ninety percents by mass iron lithium phosphate (LiFePO$_4$; manufactured by STL Energy Technology Co., Ltd.) as a positive-electrode active material was mixed with 5% by mass acetylene black as a conductive material and 5% by mass poly(vinylidene fluoride) (PVdF) as a binder in N-methylpyrrolidone solvent to obtain a slurry. The slurry obtained was applied to one surface of an aluminum foil having a thickness of 15 μm and coated beforehand with a carbonaceous material, and dried. This coated foil was rolled with a pressing machine to a thickness of 80 μm, and a piece of a shape having an active-material layer size with a width of 30 mm and a length of 40 mm and having a uncoated area with a width of 5 mm and a length of 9 mm was cut out of the rolled sheet. Thus, a positive electrode was obtained.

[Production of Electrolytic Solution]

In a dry argon atmosphere, 98.5% by mass mixture of ethylene carbonate (EC), dimethoxyethane (DME), and ethyl methyl carbonate (EMC) (volume ratio, 2:3:5) was mixed with 0.5% by mass lithium difluorophosphate (LiPO$_2$F$_2$), 0.5% by mass vinylene carbonate (VC), and 0.5% by mass monofluoroethylene carbonate (MFEC). Subsequently, sufficiently dried LiPF$_6$ was dissolved therein so as to result in a proportion thereof of 1.1 mol/L. Thus, an electrolytic solution was obtained.

[Production of Lithium Secondary Battery]

The positive electrode and negative electrode described above and a separator made of polyethylene were superposed in the order of negative electrode/separator/positive electrode to produce a battery element. This battery element was inserted into a bag constituted of a laminated film obtained by coating both surfaces of aluminum (thickness, 40 μm) with a resin layer, with the terminals of the positive and negative electrodes projecting outward. Thereafter, the electrolytic solution was introduced into the bag, and this bag was vacuum-sealed to produce a sheet battery. This battery was evaluated. The components of the electrolytic solution are shown in Table 1.

[Evaluation of Initial Discharge Capacity]

The lithium secondary battery was evaluated in the state of being sandwiched between glass plates in order to enhance contact between the electrodes. At 25° C., this battery was charged to 4.0 V at a constant current corresponding to 0.2 C and then discharged to 2.5 V at a constant current of 0.1 C. Two cycles of this charge/discharge were conducted to stabilize the battery. In each of the third to sixth cycles, the battery was charged to 4.0 V at a constant current of 0.2 C, subsequently charged at a constant voltage of 4.0 V until the current value became 0.05 C, and then discharged to 2.5 V at a constant current of 0.2 C. Thereafter, in the seventh cycle, the battery was charged to 4.0 V at a constant current of 0.2 C, subsequently charged at a constant voltage of 4.0 V until the current value became 0.05 C, and then discharged to 2.5 V at a constant current of 0.2 C to determine initial discharge capacity. Here, "1 C" means a current value at which the reference capacity of the battery is discharged over 1 hour; "5 C" means the current value which is 5 times the current of 1 C, "0.1 C" means the current value which is 1/10 the current of 1 C, and "0.2 C" means the current value which is 1/5 the current of 1 C.

[Evaluation of 25° C. Output]

The battery which had undergone the evaluation of initial discharge capacity was charged at 25° C. and a constant current of 0.2 C to a half of the initial discharge capacity. This battery was discharged at 25° C. for 10 seconds at each of 1 C, 2 C, 4 C, 7 C, 10 C, and 15 C, and the voltage was measured at the time when the 10 seconds had passed. The area of the triangle surrounded by the current-voltage line and the lower-limit voltage (2.5 V) was regarded as output (W). The relative value (%) of the output was calculated, with the output value at 25° C. of Comparative Example 1 being taken as 100.

[Evaluation of –30° C. Output]

The battery which had undergone the evaluation of initial discharge capacity was charged at 25° C. and a constant current of 0.2 C to a half of the initial discharge capacity. This battery was discharged at –30° C. for 10 seconds at each of 0.2 C, 0.4 C, 0.8 C, 1 C, and 2 C, and the voltage was measured at the time when the 10 seconds had passed. The area of the triangle surrounded by the current-voltage line and the lower-limit voltage (2.5 V) was regarded as output (W). The relative value (%) of the output was calculated, with the output value at –30° C. of Comparative Example 1 being taken as 100.

[Evaluation of High-Temperature Cycle Characteristics]

At 60° C., the battery which had undergone the test for evaluating initial discharge capacity was charged to 3.6 V at a constant current of 2 C and then discharged to 2.5 V at a constant current of 2 C. This operation was taken as one cycle, and 500 cycles were conducted. The discharge capacity (%) in the 500th cycle was determined as a value relative to the discharge capacity measured in the first cycle, which was taken as 100. This discharge capacity (%) was taken as discharge capacity retention.

[Evaluation of High-Rate Discharge Characteristics]

The battery which had undergone the high-temperature cycle test was subjected to the following test at 25° C. The battery was charged to 3.6 V at a constant current of 0.2 C and then charged at a constant voltage of 3.6 V until the current value became 0.05 C. This battery was discharged to 2.5 V at each of constant currents of 2 C and 5 C. The discharge capacities (%) at 2 C and 5 C after the high-temperature cycle test were determined as values relative to the discharge capacity determined in the initial discharge capacity test, which was taken as 100.

The results of the evaluation are shown in Tables 2 and 3.

Example 2

A sheet-form lithium secondary battery was produced and evaluated in the same manners as in Example 1, except that an electrolytic solution was obtained in a dry argon atmosphere by mixing 99.5% by mass mixture of ethylene carbonate (EC), dimethoxyethane (DME), and ethyl methyl carbonate (EMC) (volume ratio, 2:3:5) with 0.5% by mass vinylene carbonate (VC) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 3

A sheet-form lithium secondary battery was produced and evaluated in the same manners as in Example 1, except that an electrolytic solution was obtained in a dry argon atmosphere by mixing 99.5% by mass mixture of ethylene carbonate (EC), dimethoxyethane (DME), and ethyl methyl carbonate (EMC) (volume ratio, 2:3:5) with 0.5% by mass lithium difluorophosphate ($LiPO_2F_2$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 4

A sheet-form lithium secondary battery was produced and evaluated in the same manners as in Example 1, except that an electrolytic solution was obtained in a dry argon atmosphere by mixing 98.5% by mass mixture of ethylene carbonate (EC), dimethoxyethane (DME), and ethyl methyl carbonate (EMC) (volume ratio, 3:2:5) with 0.5% by mass lithium difluorophosphate ($LiPO_2F_2$), 0.5% by mass vinylene carbonate (VC), and 0.5% by mass monofluoroethylene carbonate (MFEC) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 5

A sheet-form lithium secondary battery was produced and evaluated in the same manners as in Example 1, except that an electrolytic solution was obtained in a dry argon atmosphere by mixing 99.5% by mass mixture of ethylene carbonate (EC), dimethoxyethane (DME), and ethyl methyl carbonate (EMC) (volume ratio, 3:2:5) with 0.5% by mass vinylene carbonate (VC) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 6

A sheet-form lithium secondary battery was produced and evaluated in the same manners as in Example 1, except that an electrolytic solution was obtained in a dry argon atmosphere by mixing 99.0% by mass mixture of ethylene carbonate (EC), diethoxyethane (DEE), and ethyl methyl carbonate (EMC) (volume ratio, 3:1:6) with 0.5% by mass vinylene carbonate (VC) and 0.5% by mass lithium difluorophosphate ($LiPO_2F_2$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 7

A sheet-form lithium secondary battery was produced and evaluated in the same manners as in Example 1, except that an electrolytic solution was obtained in a dry argon atmosphere by mixing 99.0% by mass mixture of ethylene carbonate (EC), ethoxy(2,2,2-trifluoroethoxy)ethane (ETFEE), and ethyl methyl carbonate (EMC) (volume ratio, 3:1:6) with 0.5% by mass vinylene carbonate (VC) and 0.5% by mass lithium difluorophosphate ($LiPO_2F_2$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 8

A sheet-form lithium secondary battery was produced and evaluated in the same manners as in Example 1, except that an electrolytic solution was obtained in a dry argon atmosphere by mixing 99.0% by mass mixture of ethylene carbonate (EC), 1,1,2,2-tetrafluoroethyl 2,2,3,3-tetrafluoro-n-propyl ether (TFETFPE), and ethyl methyl carbonate (EMC) (volume ratio, 3:1:6) with 0.5% by mass vinylene carbonate (VC) and 0.5% by mass lithium difluorophosphate ($LiPO_2F_2$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 9

A sheet-form lithium secondary battery was produced and evaluated in the same manners as in Example 1, except that an electrolytic solution was obtained in a dry argon atmosphere by mixing 98.5% by mass mixture of ethylene carbonate (EC), dimethoxyethane (DME), and ethyl methyl carbonate (EMC) (volume ratio, 3:2:5) with 0.5% by mass vinylene carbonate (VC) and 1% by mass lithium trifluoromethanesulfonate ($CF_3SO_3Li$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 10

A sheet-form lithium secondary battery was produced and evaluated in the same manners as in Example 1, except that an electrolytic solution was obtained in a dry argon atmosphere by mixing 98.5% by mass mixture of ethylene carbonate (EC), dimethoxyethane (DME), and ethyl methyl carbonate (EMC) (volume ratio, 3:2:5) with 0.5% by mass vinylene carbonate (VC) and 1% by mass lithium bis(fluorosulfonyl) imide (LiFSI) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 11

A sheet-form lithium secondary battery was produced and evaluated in the same manners as in Example 1, except that an electrolytic solution was obtained in a dry argon atmosphere by mixing 99.0% by mass mixture of ethylene carbonate (EC), dimethoxyethane (DME), and ethyl methyl carbonate (EMC) (volume ratio, 3:2:5) with 0.3% by mass vinylene carbonate (VC), 0.2% by mass 1,3-propanesultone (PS), and 0.5% by mass lithium difluorophosphate ($LiPO_2F_2$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Example 12

A sheet-form lithium secondary battery was produced and evaluated in the same manners as in Example 1, except that an electrolytic solution was obtained in a dry argon atmosphere by mixing 99.0% by mass mixture of ethylene carbonate (EC), dimethoxyethane (DME), and ethyl methyl carbonate (EMC) (volume ratio, 3:2:5) with 0.3% by mass vinylene carbonate (VC), 0.2% by mass ethylene sulfite (ES), and 0.5% by mass lithium difluorophosphate ($LiPO_2F_2$) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Comparative Example 1

A sheet-form lithium secondary battery was produced and evaluated in the same manners as in Example 1, except that an electrolytic solution was obtained in a dry argon atmosphere by mixing 99.5% by mass mixture of ethylene carbonate (EC), dimethyl carbonate (DMC), and ethyl methyl carbonate (EMC) (volume ratio, 3:3:4) with 0.5% by mass vinylene carbonate (VC) and then dissolving sufficiently dried $LiPF_6$ in the resultant mixture so as to result in a proportion thereof of 1 mol/L. The components of the electrolytic solution and the results of the evaluation are shown in Table 1 to Table 3.

Comparative Example 2

A sheet-form lithium secondary battery was produced and evaluated in the same manners as in Example 1, except that an electrolytic solution was obtained in a dry argon atmosphere by mixing 99% by mass mixture of ethylene carbonate (EC), dimethyl carbonate (DMC), and ethyl methyl carbonate (EMC) (volume ratio, 3:3:4) with 1% by mass vinylene carbonate (VC) and then dissolving sufficiently dried $LiPF_6$ in the resultant mixture so as to result in a proportion thereof of 1 mol/L. The components of the electrolytic solution and the results of the evaluation are shown in Table 1 to Table 3.

Comparative Example 3

A sheet-form lithium secondary battery was produced and evaluated in the same manners as in Example 1, except that an electrolytic solution was obtained in a dry argon atmosphere by mixing 99.5% by mass mixture of ethylene carbonate (EC), dimethyl carbonate (DMC), and ethyl methyl carbonate (EMC) (volume ratio, 3:3:4) with 0.5% by mass vinylethylene carbonate (VEC) and then dissolving sufficiently dried $LiPF_6$ in the resultant mixture so as to result in a proportion thereof of 1 mol/L. The components of the electrolytic solution and the results of the evaluation are shown in Table 1 to Table 3.

Comparative Example 4

A sheet-form lithium secondary battery was produced and evaluated in the same manners as in Example 1, except that an electrolytic solution was obtained in a dry argon atmosphere by mixing 99.5% by mass mixture of ethylene carbonate (EC), dimethyl carbonate (DMC), and ethyl methyl carbonate (EMC) (volume ratio, 3:3:4) with 0.5% by mass 1,3-propanesultone (PS) and then dissolving sufficiently dried $LiPF_6$ in the resultant mixture so as to result in a proportion thereof of 1 mol/L. The components of the electrolytic solution and the results of the evaluation are shown in Table 1 to Table 3.

Comparative Example 5

A sheet-form lithium secondary battery was produced and evaluated in the same manners as in Example 1, except that an electrolytic solution was obtained in a dry argon atmosphere by mixing a mixture of ethylene carbonate (EC), dimethoxyethane (DME), and ethyl methyl carbonate (EMC) (volume ratio, 3:2:5) and then dissolving sufficiently dried $LiPF_6$ in the resultant mixture so as to result in a proportion thereof of 1.1 mol/L. The components of the electrolytic solution and the results of the evaluation are shown in Table 1 to Table 3.

Comparative Example 6

Production of Positive Electrode

Ninety percents by mass $Li(Ni_{1/3}Mn_{1/3}Co_{1/3})O_2$ (NMC) as a positive-electrode active material was mixed with 5% by mass acetylene black as a conductive material and 5% by mass poly(vinylidene fluoride) (PVdF) as a binder in N-methylpyrrolidone solvent to obtain a slurry. The slurry obtained was applied to one surface of an aluminum foil having a thickness of 15 μm and coated beforehand with a conduction aid, and dried. This coated foil was rolled with a pressing machine to a thickness of 80 μm, and a piece of a shape having an active-material layer size with a width of 30 mm and a length of 40 mm and having a uncoated area with a width of 5 mm and a length of 9 mm was cut out of the rolled sheet. Thus, a positive electrode was obtained.

[Production of Electrolytic Solution]

A sheet-form lithium secondary battery was produced in the same manner as in Example 1, except that an electrolytic solution was obtained in a dry argon atmosphere by mixing 99.0% by mass mixture of ethylene carbonate (EC), dimethoxyethane (DME), and ethyl methyl carbonate (EMC) (volume ratio, 2:3:5) with 1.0% by mass $LiN(FSO_2)_2$ (LiFSI) and then dissolving sufficiently dried $LiPF_6$ in the resultant mixture so as to result in a proportion thereof of 1.1 mol/L. The components of the electrolytic solution are shown in Table 1.

[Evaluation of Initial Discharge Capacity]

The lithium secondary battery produced above was evaluated in the state of being sandwiched between glass plates in order to enhance contact between the electrodes. At 25° C., this battery was charged to 4.1 V at a constant current corresponding to 0.2 C and then discharged to 3 V at a constant current of 0.2 C. Two cycles of this charge/discharge were conducted to stabilize the battery. In the third cycle, the battery was charged to 4.2 V at a constant current of 0.2 C, subsequently charged at a constant voltage of 4.2 V until the current value became 0.05 C, and then discharged to 3 V at a constant current of 0.2 C. Thereafter, in the fourth cycle, the battery was charged to 4.2 V at a constant current of 0.2 C, subsequently charged at a constant voltage of 4.2 V until the current value became 0.05 C, and then discharged to 3 V at a constant current of 0.2 C to determine initial discharge capacity. Here, "1 C" means a current value at which the reference capacity of the battery is discharged over 1 hour; "5 C" means the current value which is 5 times the current of 1 C, "0.1 C" means the current value which is 1/10 the current of 1 C, and "0.2 C" means the current value which is 1/5 the current of 1 C.

[Evaluation of High-Temperature Cycle Characteristics]

At 60° C., the battery which had undergone the test for evaluating initial discharge capacity was charged to 4.2 V at a constant current of 2 C and then discharged to 3 V at a constant current of 2 C. This operation was taken as one cycle, and 500 cycles were conducted. The discharge capacity (%) in the 500th cycle was determined as a value relative to the discharge capacity measured in the first cycle, which was taken as 100. This discharge capacity (%) was taken as discharge capacity retention.

[Evaluation of High-Rate Discharge Characteristics]

The battery which had undergone the high-temperature cycle test was subjected to the following test at 25° C. The battery was charged to 4.2 V at a constant current of 0.2 C and then charged at a constant voltage of 4.2 V until the current value became 0.05 C. This battery was discharged to 3 V at each of constant currents of 2 C and 5 C. The discharge capacities (%) at 2 C and 5 C after the high-temperature cycle test were determined as values relative to the discharge capacity determined in the initial discharge capacity test, which was taken as 100.

The results of the evaluation are shown in Tables 2 and 3.

TABLE 1

| | Solvent (ratio) | Additive (mass%) |
|---|---|---|
| Example 1 | EC:DME:EMC (20:30:50) | $LiPO_2F_2$ (0.5) VC (0.5) MFEC (0.5) |
| Example 2 | EC:DME:EMC (20:30:50) | VC (0.5) |
| Example 3 | EC:DME:EMC (20:30:50) | $LiPO_2F_2$ (0.5) |
| Example 4 | EC:DME:EMC (30:20:50) | $LiPO_2F_2$ (0.5) VC (0.5) MFEC (0.5) |
| Example 5 | EC:DME:EMC (30:20:50) | VC (0.5) |
| Example 6 | EC:DEE:EMC (30:10:60) | VC (0.5) $LiPO_2F_2$ (0.5) |
| Example 7 | EC:ETFEE:EMC (30:10:60) | VC (0.5) $LiPO_2F_2$ (0.5) |
| Example 8 | EC:TFETFPE:EMC (30:10:60) | VC (0.5) $LiPO_2F_2$ (0.5) |
| Example 9 | EC:DME:EMC (30:20:50) | VC (0.5) $CF_3SO_3Li$ (1) |
| Example 10 | EC:DME:EMC (30:20:50) | VC (0.5) LiFSI (1) |
| Example 11 | EC:DME:EMC (30:20:50) | VC (0.3) PS (0.2) $LiPO_2F_2$ (0.5) |
| Example 12 | EC:DME:EMC (30:20:50) | VC (0.3) ES (0.2) $LiPO_2F_2$ (0.5) |
| Comparative Example 1 | EC:DMC:EMC (30:30:40) | VC (0.5) |
| Comparative Example 2 | EC:DMC:EMC (30:30:40) | VC (1.0) |
| Comparative Example 3 | EC:DMC:EMC (30:30:40) | VEC (0.5) |
| Comparative Example 4 | EC:DMC:EMC (20:30:50) | PS (0.5) |
| Comparative Example 5 | EC:DME:EMC (20:30:50) | none |
| Comparative Example 6 | EC:DME:EMC (20:30:50) | LiFSI (1) |

TABLE 2

| | Output relative to Comparative Example 1 (%) | |
|---|---|---|
| | 25° C. | −30° C. |
| Example 1 | 115.5 | 149.3 |
| Example 2 | 112.2 | 114.0 |
| Example 3 | 116.6 | 176.6 |
| Example 4 | 105.7 | 118.8 |
| Example 5 | 108.0 | 105.9 |
| Example 6 | 111.3 | 133.3 |
| Example 7 | 110.4 | 128.5 |
| Example 8 | 107.8 | 122.0 |
| Example 9 | 112.0 | 136.5 |
| Example 10 | 112.6 | 134.9 |
| Example 11 | 111.0 | 130.1 |
| Example 12 | 113.0 | 131.7 |
| Comparative Example 1 | 100 | 100 |
| Comparative Example 2 | 98.5 | 93.1 |
| Comparative Example 3 | 91.5 | 94.7 |
| Comparative Example 4 | 90.8 | 99.5 |

TABLE 3

| | Discharge capacity retention after 500 cycles (%) | 2-C discharge capacity after 500 cycles (%) | 5-C discharge capacity after 500 cycles (%) |
|---|---|---|---|
| Example 1 | 66.4 | 59.9 | 58.7 |
| Example 2 | 65.1 | 59.3 | 57.6 |
| Example 3 | 51.4 | 39.1 | 37.9 |
| Example 4 | 77.8 | 72.4 | 69.5 |
| Example 6 | 71.3 | 64.8 | 61.5 |
| Example 7 | 65.4 | 60.9 | 57.4 |
| Example 8 | 71.7 | 62.1 | 58.6 |
| Example 9 | 67.8 | 66.5 | 63.9 |
| Example 10 | 68.1 | 65.6 | 62.9 |
| Example 11 | 64.8 | 58.7 | 55.9 |
| Example 12 | 67.8 | 60.0 | 56.9 |
| Comparative Example 4 | 23.4 | 26.1 | 23.5 |
| Comparative Example 5 | 40.7 | 33.9 | 29.7 |
| Comparative Example 6 | 45.0 | 35.7 | 30.5 |

As apparent from Table 2, the nonaqueous-electrolyte batteries of the invention are superior in initial output at 25° C. and −30° C. As apparent from Table 3, the batteries of the invention are superior in high-temperature cycle characteristics and in high-current-density discharge characteristics determined after the high-temperature cycle test. It was hence found that the batteries of the invention have high durability. In contrast, the batteries employing nonaqueous electrolytic solutions which are not the nonaqueous electrolytic solutions according to the invention are lower in initial output at 25° C. and −30° C. than the batteries employing the nonaqueous electrolytic solutions according to the invention, and are inferior in high-temperature cycle characteristics and in high-current-density discharge characteristics determined after the high-temperature cycle test.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 29, 2009 (Application No. 2009-223809), the contents thereof being incorporated herein by reference.

INDUSTRIAL APPLICABILITY

The nonaqueous-electrolyte batteries of the invention have a high initial output at ordinary temperature and −30° C., attain a high discharge capacity even during high-rate discharge, and have a high capacity retention after a durability test such as a high-temperature storage test or cycle test. In addition, even after the durability test, the batteries of the invention have the excellent output performance and high-rate discharge capacity equal to the initial values.

The invention claimed is:

1. A nonaqueous-electrolyte battery, comprising:
   a current collector;
   a positive electrode comprising an iron lithium phosphate of an olivine structure having the basic composition LiFePO$_4$ as a positive-electrode active material;
   a negative electrode comprising a negative-electrode active material capable of occluding and releasing lithium ions; and
   a nonaqueous electrolytic solution comprising:
   (1) a chain ether having 3-10 carbon atoms, in an amount of 5% by volume or higher and 70% by volume or less;
   (2) vinylene carbonate, in an amount of 0.01% by mass or more and 5% by mass or less, based on an entire mass of the nonaqueous electrolytic solution; and
   (3) ethylene carbonate in an amount of 15% by volume or more and 40% by volume or less.

2. The battery according to claim 1, wherein a content of the vinylene carbonate is 0.1% by mass or more and 3% by mass or less based on an entire mass of the nonaqueous electrolytic solution.

3. The battery according to claim 1, wherein the nonaqueous electrolytic solution comprises the ethylene carbonate in an amount of 20% by volume or more and 30% by volume or less.

4. The battery according to claim 1, wherein:
   the chain ether is represented by $R^1OR^2$;
   $R^1$ and $R^2$ each represent an optionally fluorine-atom substituted monovalent organic group having 1-8 carbon atoms; and
   $R^1$ and $R^2$ may be the same or different.

5. The battery according to claim 1, wherein the negative-electrode active material is a carbonaceous material.

6. The battery according to claim 1, wherein the current collector has an electroconductive layer on the surface thereof, said electroconductive layer being different from the current collector in compound composition.

7. The battery according to claim 1, wherein the chain ether is dimethoxyethane.

8. The battery according to claim 1, wherein the chain ether is at least one selected from the group consisting of diethyl ether, di(2-fluoroethyl)ether, di(2,2-difluoroethyl)ether, di(2,2,2-trifluoroethyl)ether, ethyl 2-fluoroethyl ether, ethyl 2,2,2-trifluoroethyl ether, ethyl 1,1,2,2-tetrafluoroethyl ether, 2-fluoroethyl 2,2,2-trifluoroethyl ether, 2-fluoroethyl 1,1,2,2-tetrafluoroethyl ether, 2,2,2-trifluoroethyl 1,1,2,2-tetrafluoroethyl ether, ethyl n-propyl ether, ethyl 3-fluoro-n-propyl ether, ethyl 3,3,3-trifluoro-n-propyl ether, ethyl 2,2,3,3-tetrafluoro-n-propyl ether, ethyl 2,2,3,3,3-pentafluoro-n-propyl ether, 2-fluoroethyl n-propyl ether, 2-floroethyl 3-fluoro-n-propyl ether, 2-fluoroethyl 3,3,3-trifluoro-n-propyl ether, 2-fluoroethyl 2,2,3,3-tetrafluoro-n-propyl ether, 2-fluoroethyl 2,2,3,3,3-pentafluoro-n-propyl ether, 2,2,2-trifluoroethyl n-propyl ether, 2,2,2-trifluoroethyl 3-fluoro-n-propyl ether, 2,2,2-trifluoroethyl 3,3,3-trifluoro-n-propyl ether, 2,2,2-trifluoroethyl 2,2,3,3-tetrafluoro-n-propyl ether, 2,2,2-trifluoroethyl 2,2,3,3,3-pentafluoro-n-propyl ether, 1,1,2,2-tetrafluoroethyl n-propyl ether, 1,1,2,2-tetrafluoroethyl 3-fluoro-n-propyl ether, 1,1,2,2-tetrafluoroethyl 3,3,3-trifluoro-n-propyl ether, 1,1,2,2-tetrafluoroethyl 2,2,3,3-tetrafluoro-n-propyl ether, 1,1,2,2-tetrafluoroethyl 2,2,3,3,3-pentafluoro-n-propyl ether, di-n-propyl ether, n-propyl 3-fluoro-n-propyl ether, n-propyl 3,3,3-trifluoro-n-propyl ether, n-propyl 2,2,3,3-tetrafluoro-n-propyl ether, n-propyl 2,2,3,3,3-pentafluoro-n-propyl ether, di(3-fluoro-n-propyl)ether, 3-fluoro-n-propyl 3,3,3-trifluoro-n-propyl ether, 3-fluoro-n-propyl 2,2,3,3-tetrafluoro-n-propyl ether, 3-fluoro-n-propyl 2,2,3,3,3-pentafluoro-n-propyl ether, di(3,3,3-trifluoro-n-propyl)ether, 3,3,3-trifluoro-n-propyl 2,2,3,3-tetrafluoro-n-propyl ether, 3,3,3-trifluoro-n-propyl 2,2,3,3,3-pentafluoro-n-propyl ether, di(2,2,3,3-tetrafluoro-n-propyl)ether, 2,2,3,3-tetrafluoro-n-propyl 2,2,3,3,3-pentafluoro-n-propyl ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, 2-fluoroethoxy(2,2,2-trifloroethoxy)methane, 2-fluoroethoxy(1,1,2,2-tetrafluoroethoxy)methane, di(2,2,2-trifluoroethoxy)methane, 2,2,2-trifluoroethoxy(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, 2-fluoroethoxy(2,2,2-trifloroethoxy)ethane, 2-fluoroethoxy(1,1,2,2-tetrafluoroethoxy)ethane, di(2,2,2-trifluoroethoxy)ethane, 2,2,2-trifluoroethoxy(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

9. The battery according to claim 1, wherein the chain ether is at least one selected from the group consisting of dimethoxymethane, diethoxymethane, ethoxymethoxymethane, ethylene glycol di-n-propyl ether, ethylene glycol di-n-butyl ether, and diethylene glycol dimethyl ether.

10. The battery according to claim 1, wherein the chain ether is at least one selected from the group consisting of 2,2,2-trifluoroethyl 2,2,3,3-tetrafluoro-n-propyl ether, 1,1,2,2-tetrafluoroethyl 3,3,3-trifluoro-n-propyl ether, 1,1,2,2-tetrafluoroethyl 2,2,3,3-tetrafluoro-n-propyl ether, 3,3,3-trifluoro-n-propyl 2,2,3,3-tetrafluoro-n-propyl ether, 3,3,3-trifluoro-n-propyl 2,2,3,3,3-pentafluoro-n-propyl ether, and di(2,2,3,3-tetrafluoro-n-propyl)ether.

11. An electrolytic solution, comprising:
   (1) a chain ether having 3-10 carbon atoms, in an amount of 5% by volume or higher and 70% by volume or less;
   (2) vinylene carbonate, in an amount of 0.01% by mass or more and 5% by mass or less, based on an entire mass of the electrolytic solution; and
   (3) ethylene carbonate in an amount of 15% by volume or more and 40% by volume or less.

12. The electrolytic solution according to claim 11, wherein a content of the vinylene carbonate is 0.1% by mass or more and 3% by mass or less based on an entire mass of the electrolytic solution.

13. The electrolytic solution according to claim 11, comprising the ethylene carbonate in an amount of 20% by volume or more and 30% by volume or less.

14. The electrolytic solution according to claim 11, wherein:
   the chain ether is represented by $R^1OR^2$;
   $R^1$ and $R^2$ each represent an optionally fluorine-atom substituted monovalent organic group having 1-8 carbon atoms; and
   $R^1$ and $R^2$ may be the same or different.

* * * * *